(12) United States Patent
Brewer et al.

(10) Patent No.: US 12,052,942 B2
(45) Date of Patent: Aug. 6, 2024

(54) SEED TREATER

(71) Applicant: Monsanto Technology LLC, St. Louis, MO (US)

(72) Inventors: Damien Brewer, Dardenne Prairie, MO (US); Vallabh Makadia, St. Louis, MO (US); Daniel J. Seyer, Ballwin, MO (US)

(73) Assignee: MONSANTO TECHNOLOGY LLC, St. Louis, MO (US)

( * ) Notice: Subject to any disclaimer, the term of this patent is extended or adjusted under 35 U.S.C. 154(b) by 301 days.

(21) Appl. No.: 17/290,176

(22) PCT Filed: Nov. 1, 2019

(86) PCT No.: PCT/US2019/059322
§ 371 (c)(1),
(2) Date: Apr. 29, 2021

(87) PCT Pub. No.: WO2020/092866
PCT Pub. Date: May 7, 2020

(65) Prior Publication Data
US 2021/0378162 A1 Dec. 9, 2021

Related U.S. Application Data

(60) Provisional application No. 62/754,260, filed on Nov. 1, 2018.

(51) Int. Cl.
*A01C 1/06* (2006.01)
*B01F 27/272* (2022.01)
(Continued)

(52) U.S. Cl.
CPC .............. *A01C 1/06* (2013.01); *B01F 27/272* (2022.01); *B01F 2101/09* (2022.01)

(58) Field of Classification Search
CPC ................................... A01C 1/06; A01C 1/00
See application file for complete search history.

(56) References Cited

U.S. PATENT DOCUMENTS

| 1,721,423 A | 7/1929 | Warren |
| 4,356,934 A * | 11/1982 | Knake ...................... A01C 1/06 |

(Continued)

FOREIGN PATENT DOCUMENTS

| CA | 2976865 C * | 4/2023 | ............... A01C 1/06 |
| DE | 41 28 258 A1 | 2/1993 | |

(Continued)

OTHER PUBLICATIONS

Extended European Search Report for 1987969.8, Jun. 27, 2022, Jan. 24, 2020, 8 pages, Germany.

(Continued)

*Primary Examiner* — Monica L Perry
*Assistant Examiner* — Spencer T Callaway
(74) *Attorney, Agent, or Firm* — Gale Wesley Starkey

(57) ABSTRACT

A seed treater having upper and lower ends includes a mixing bowl. The mixing bowl includes a stator having an annular upper inner surface defining an upper portion of the open interior of the mixing bowl, and a rotor defining a lower portion of the open interior of the mixing bowl. An air duct is fluidly connected to the mixing bowl and is configured to be fluidly connected to an air mover. The air duct includes a duct outlet configured to direct forced air from the air mover into the upper portion of the open interior defined by the upper stator to direct the seeds flowing in the upper portion of the interior of the mixing bowl inward toward a generally vertical axis of the mixing bowl as the lower rotor rotates relative to the upper stator.

20 Claims, 8 Drawing Sheets

(51) Int. Cl.
*A01C 1/00* (2006.01)
*B01F 101/09* (2022.01)

(56) References Cited

U.S. PATENT DOCUMENTS

| | | | | |
|---|---|---|---|---|
| 5,582,643 | A * | 12/1996 | Takei | A61J 3/005 |
| | | | | 118/19 |
| 5,783,250 | A * | 7/1998 | Kohno | A01C 1/06 |
| | | | | 427/430.1 |
| 6,048,571 | A | 4/2000 | Kohno et al. | |
| 6,148,748 | A | 11/2000 | Bardi et al. | |
| 6,758,161 | B2 | 7/2004 | Nohynek | |
| 7,487,892 | B1 * | 2/2009 | Hirsch | A01C 1/00 |
| | | | | 222/242 |
| 2012/0183675 | A1 | 7/2012 | Reineccius et al. | |
| 2013/0273236 | A1 | 10/2013 | Reineccius et al. | |
| 2014/0263434 | A1 * | 9/2014 | Renyer | A01C 1/00 |
| | | | | 414/304 |
| 2014/0318009 | A1 * | 10/2014 | Strahm | A01C 1/06 |
| | | | | 47/57.6 |
| 2016/0167067 | A1 | 6/2016 | Paris | |
| 2016/0198622 | A1 | 7/2016 | Mehrkens | |
| 2018/0124994 | A1 * | 5/2018 | Kaeb | F26B 21/08 |
| 2020/0170175 | A1 * | 6/2020 | Brewer | A01C 1/06 |

FOREIGN PATENT DOCUMENTS

| | | | | |
|---|---|---|---|---|
| DE | 4411058 A1 * | 10/1995 | | A01C 1/06 |
| WO | 2016162281 A1 | 10/2016 | | |
| WO | WO-2019143259 A1 * | 7/2019 | | A01C 1/06 |

OTHER PUBLICATIONS

PCT International Search Report and Written Opinion for PCT/US19/059322, Jan. 24, 2020, 10 pages, United States.

* cited by examiner

SEED TREATER

FIELD OF THE DISCLOSURE

The present disclosure relates to a seed treater and a method of treating seeds.

BACKGROUND

Agricultural seeds are often treated before planting. In seed treatment processes, one or more seed treatment components, such as biological or chemical agents, are applied to seeds using a seed treater. Typically, the seed treater includes baffles in a mixing bowl to facilitate mixing of the seeds and treatment together, thereby coating the seeds.

SUMMARY OF THE DISCLOSURE

In one aspect, a seed treater having upper and lower ends generally comprises a mixing bowl defining an open interior having a generally vertical axis, and being configured to mix a seed treatment with seeds received in the open interior of the mixing bowl. The mixing bowl includes a stator having an annular upper inner surface extending around the vertical axis of the mixing bowl and defining and upper portion of the open interior of the mixing bowl, and a rotor having a generally concave inner surface below the annular upper inner surface of the stator and defining a lower portion of the open interior of the mixing bowl. The rotor is rotatable relative to the stator about the vertical axis of the mixing bowl so that seeds within the lower portion of the open interior of the mixing bowl flow upward along the generally concave inner surface to the annular inner surface of the stator. An air duct is fluidly connected to the mixing bowl and configured to be fluidly connected to an air mover. The air duct includes a duct outlet configured to direct forced air from the air mover into the upper portion of the open interior defined by the upper stator to direct the seeds flowing in the upper portion of the interior of the mixing bowl inward toward the generally vertical axis of the mixing bowl as the lower rotor rotates relative to the upper stator.

A method of treating seeds generally comprises loading seeds into a mixing bowl defining an open interior having a generally vertical axis. The mixing bowl includes an upper stator having an annular inner surface extending around the vertical axis of the mixing bowl and defining an upper portion of the open interior of the mixing bowl, and a lower rotor having a generally concave inner surface defining a lower portion of the open interior of the mixing bowl. The lower rotor of the mixing rotates relative to the upper stator about the vertical axis of the mixing bowl so that the seeds within the open interior of the mixing bowl flow upward along the generally concave inner surface to the annular inner surface of the upper stator. Forced air is delivered, simultaneously with said rotating the lower rotor, through a duct outlet of an air duct into the upper portion of the open interior defined by the upper stator to direct the seeds flowing in the upper portion of the interior of the mixing bowl inward toward the generally vertical axis of the mixing bowl.

BRIEF DESCRIPTION THE DRAWINGS

Corresponding reference characters indicate corresponding parts throughout the drawings.

DETAILED DESCRIPTION

In general, the systems, devices, and processes described herein are suitable for applying a seed treatment to exterior surfaces of seeds.

Seed Treater

Referring to FIGS. 1A-4, one embodiment of a seed treater (e.g., a batch seed treater) for applying one or more seed treatment components (e.g., treatment or seed treatment) to seeds is generally indicated at reference number 10. The seed treater 10 includes a mixing bowl, generally indicated at 12, and an air duct, generally indicated at 16, comprises at least one duct fitting, generally indicated at 14, constructed according to the teachings of the present disclosure. The other components illustrated in FIG. 1A may be generally known in the art of seed treaters and are explained in more detail below.

Figure 1A:
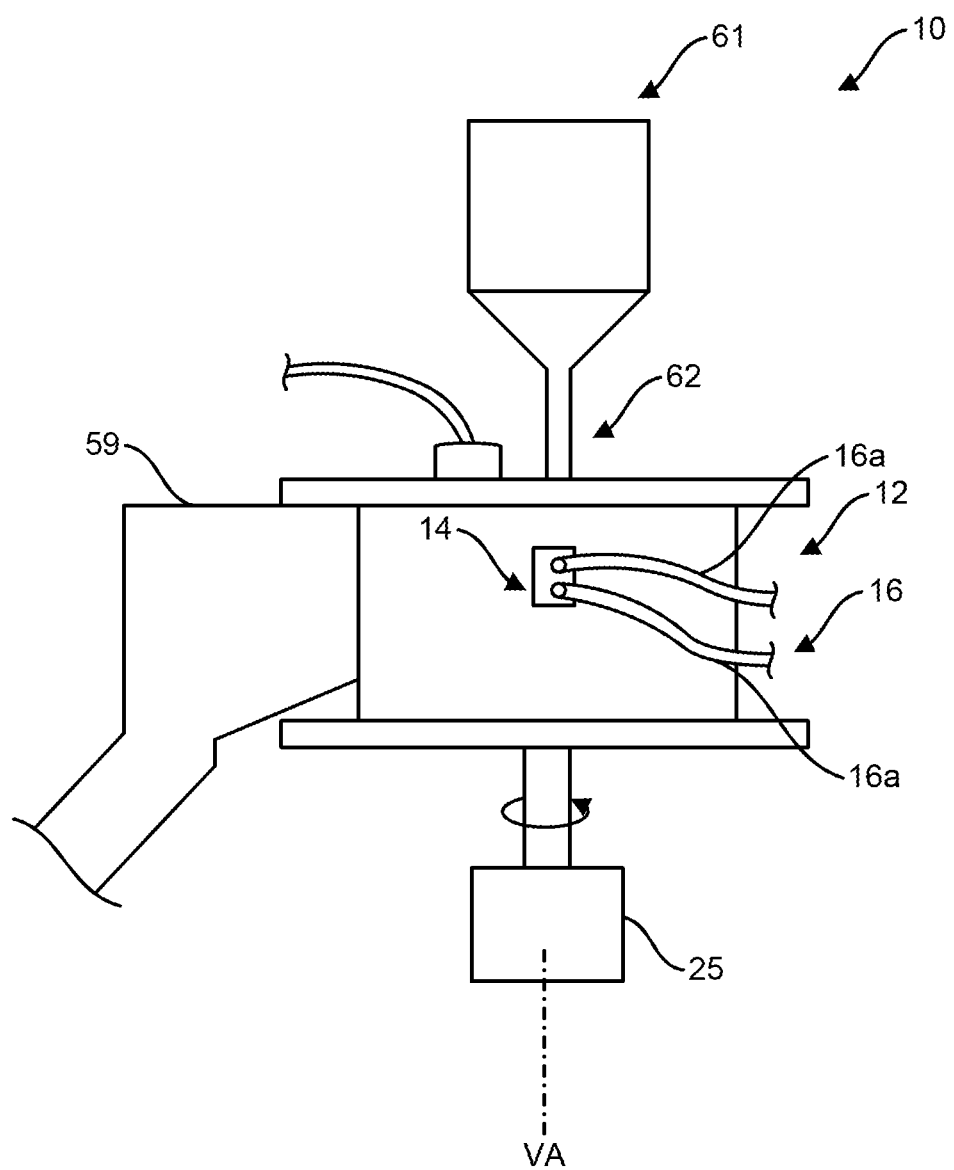
FIG. 1A is a front view of a seed treater including a mixing bowl constructed according to the teachings of the present disclosure.
Figure 1B:
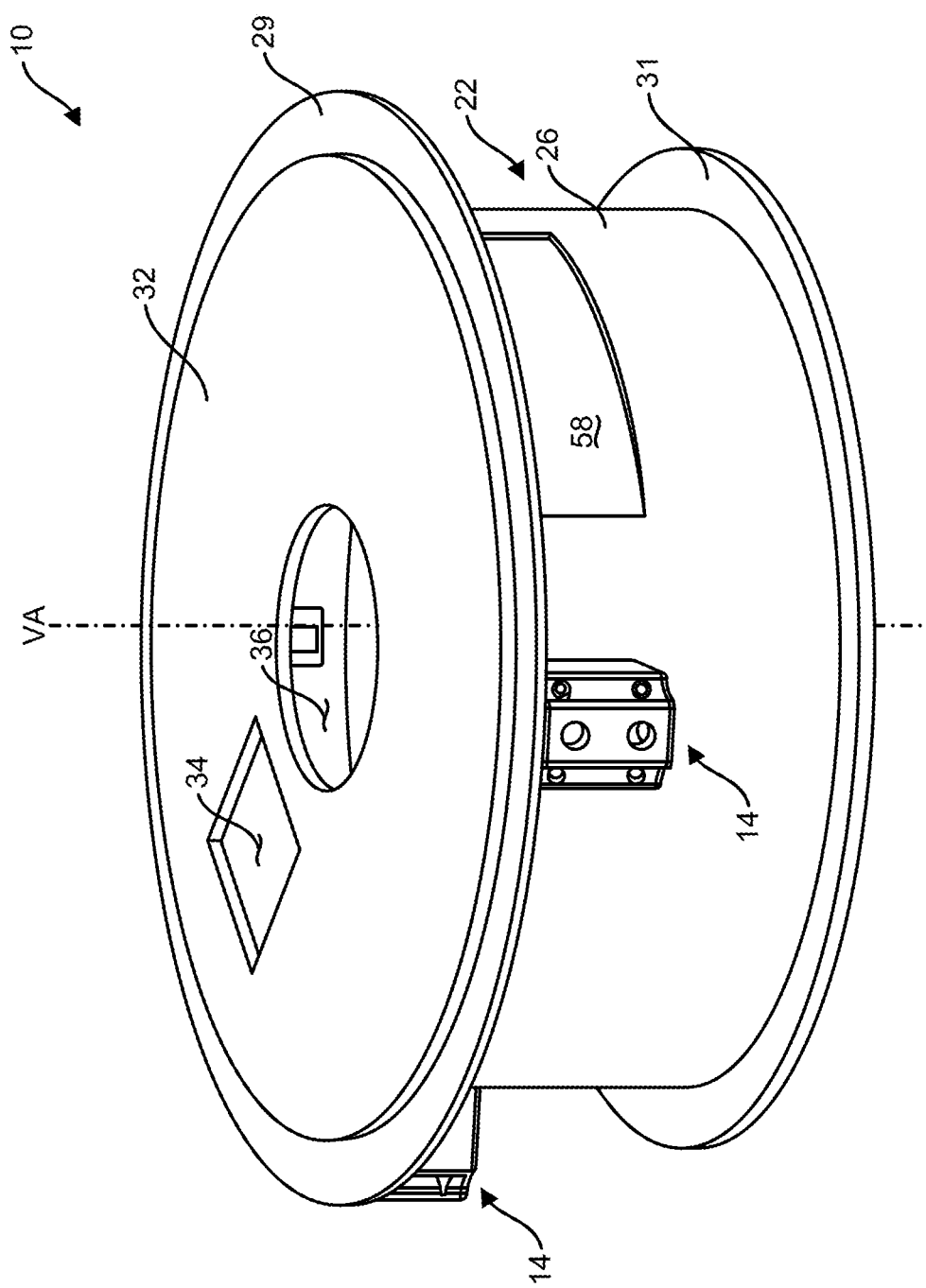
FIG. 1B is a perspective of a mixing bowl for a seed treater.
Figure 2:
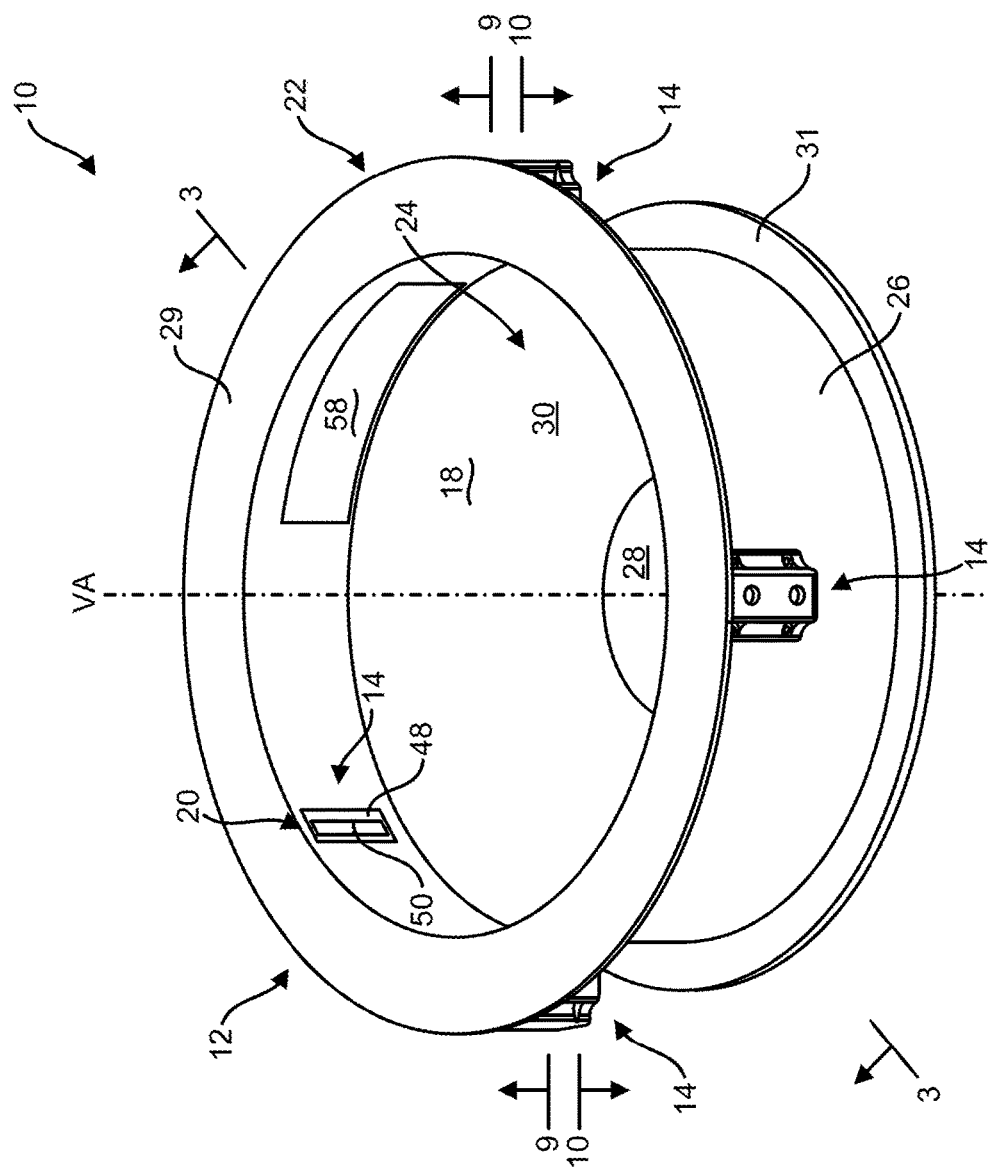
FIG. 2 is a perspective of the mixing bowl with a lid thereof removed.
Figure 4:
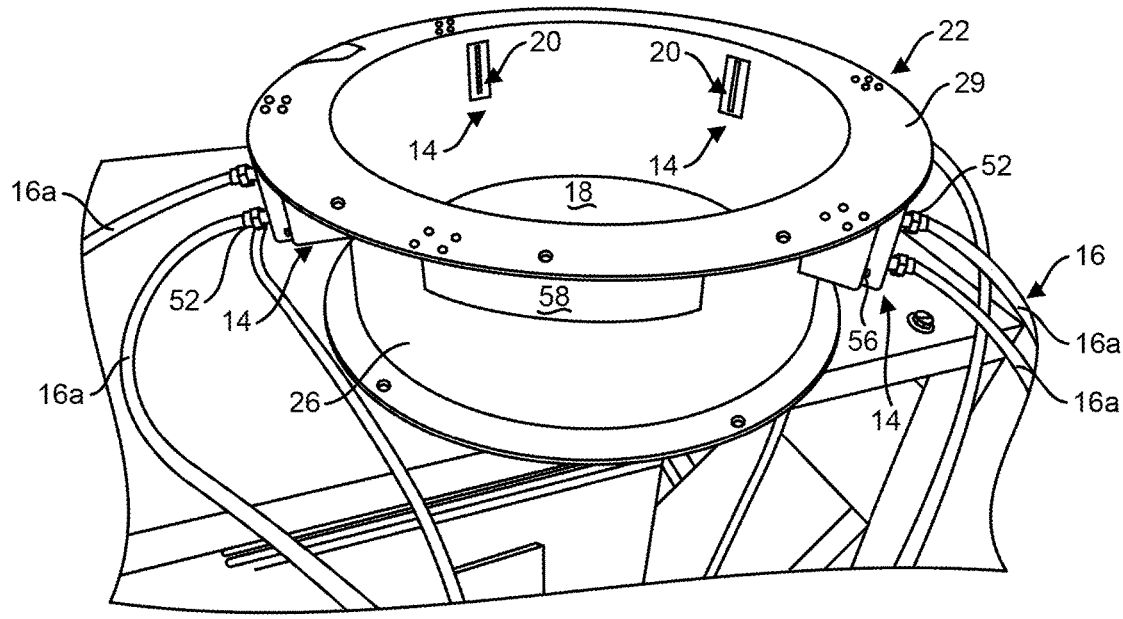
FIG. 4 is a perspective of a stator of the mixing bowl, including air ducts attached thereto.

Referring to FIGS. 1B, 2, and 4, the mixing bowl 12 of the seed treater 10 generally includes a stator, generally indicated at 22, and a rotor, generally indicated at 24, that together define an open interior 18 (e.g., mixing chamber) configured to receive seeds and treatment therein. The one or more duct fittings 14 are mounted on the stator 22 of the mixing bowl 12. Each of the air ducts 16 includes one or more duct outlets 20 configured to direct forced air from the air duct into the open interior 18. Referring to FIG. 1A, a driver, generally indicated at 25, drives 360° rotation of the rotor 24 about a vertical axis VA (e.g., rotational axis) of the mixing bowl 12 relative to the stator 22. As the rotor 24 rotates, the duct outlets 20 direct forced air into the open interior 18 to redirect the seeds to facilitate mixing of the seeds and treatment together, as described in more detail below.

Figure 3:
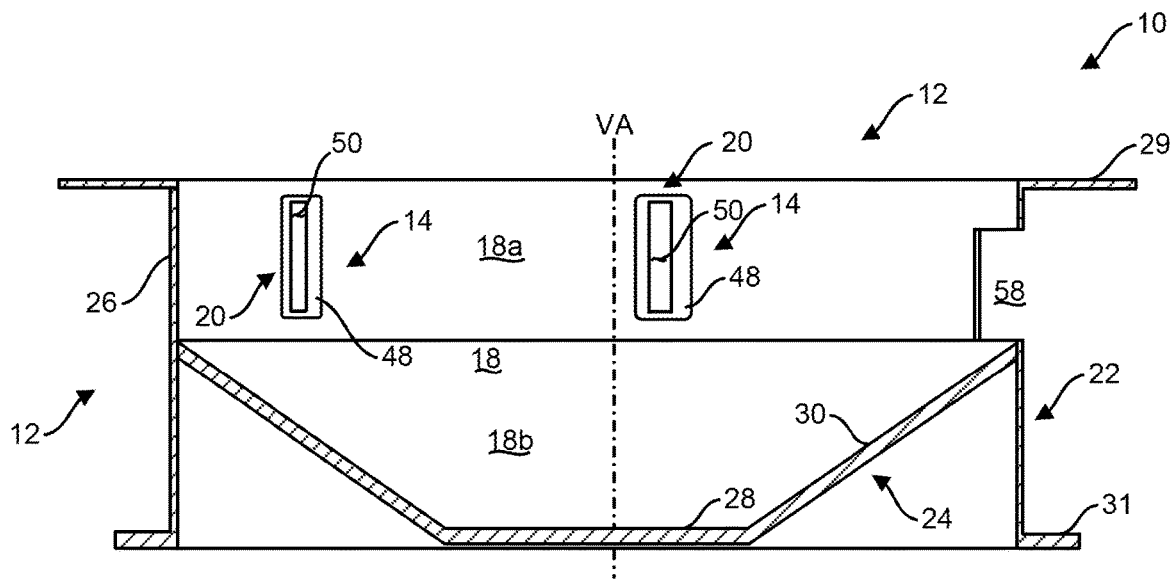
FIG. 3 is a section of the mixing bowl taken through line 3-3 of FIG. 2.

Referring to FIG. 3, the stator 22 includes a generally cylindrical annular wall 26 that defines the vertical axis VA of the mixing bowl 12. The annular wall 26 has an annular inner surface and an outer surface, relative to the vertical axis VA. Upper and lower flanges 29 and 31, respectively, extend radially outward and transverse to the vertical axis VA from upper and lower ends, respectively, of the annular wall 26. The rotor 24 is positioned within the lower portion of the stator 22. The rotor 24 has a generally concave shape with a generally circular, planar base 28 (or bottom) at a lower end of the bowl 12. The base 28 extends radially outward from and generally transverse to the vertical axis VA toward the annular wall 26. In the illustrated embodiment, the base 28 extends about ⅓ of the way to the annular wall 28 from the vertical axis VA but in other embodiments may extend at other distances. An angular or cone-shaped side wall 30 of the rotor 24 extends circumferentially about the vertical axis VA from the base 28 in a generally upward and radially outward direction toward the annular wall 26. In the illustrated embodiment, the angular side wall 30 extends toward the midpoint of the annular wall 26 (e.g., the upper end of the angular side wall is about half way between the upper and lower ends of the annular wall).

When received in the stator 22, the rotor 24 is free to rotate 360° about the vertical axis VA relative to the stator. The driver 25 is operatively connected to the rotor 24 to drive rotation of the rotor about the vertical axis VA. The driver may comprise a primer mover (e.g., a motor, such as an electric motor). The angular side wall 30 of the rotor 24 is in a close fitting relationship with the annular wall 26 such that seeds and/or treatment cannot pass between the rotor and stator 22. As shown in FIG. 3, the upper portion of the inner surface of the annular wall 26 defines an upper portion 18a of the open interior 18. A lower portion 18b of the open interior 18 is defined by the upper surface of the base 28 and the inner surface of the angular side wall 30 (e.g., a generally concave inner surface of the rotor 24). The annular wall 26 generally defines upper vertical sides of the open interior 18 and the base 28 and angular side wall 30 define a generally concave lower end of the open interior. In cross section (FIG. 3), the base 28, angular side wall 30, and annular wall 26 are generally straight (e.g., linear). It is understood that in other embodiments the base 28, angular side wall 30 and/or annular wall 26 may have other shapes in cross section. For example, the base 28 and/or the angular side wall 30 may be curvilinear (e.g., the stator 20 may have a more hemispheroid shape with a curved concave inner surface). The stator 22 and rotor 24 may have other shapes and configurations than described herein that are within the scope of the present disclosure.

Figure 8:
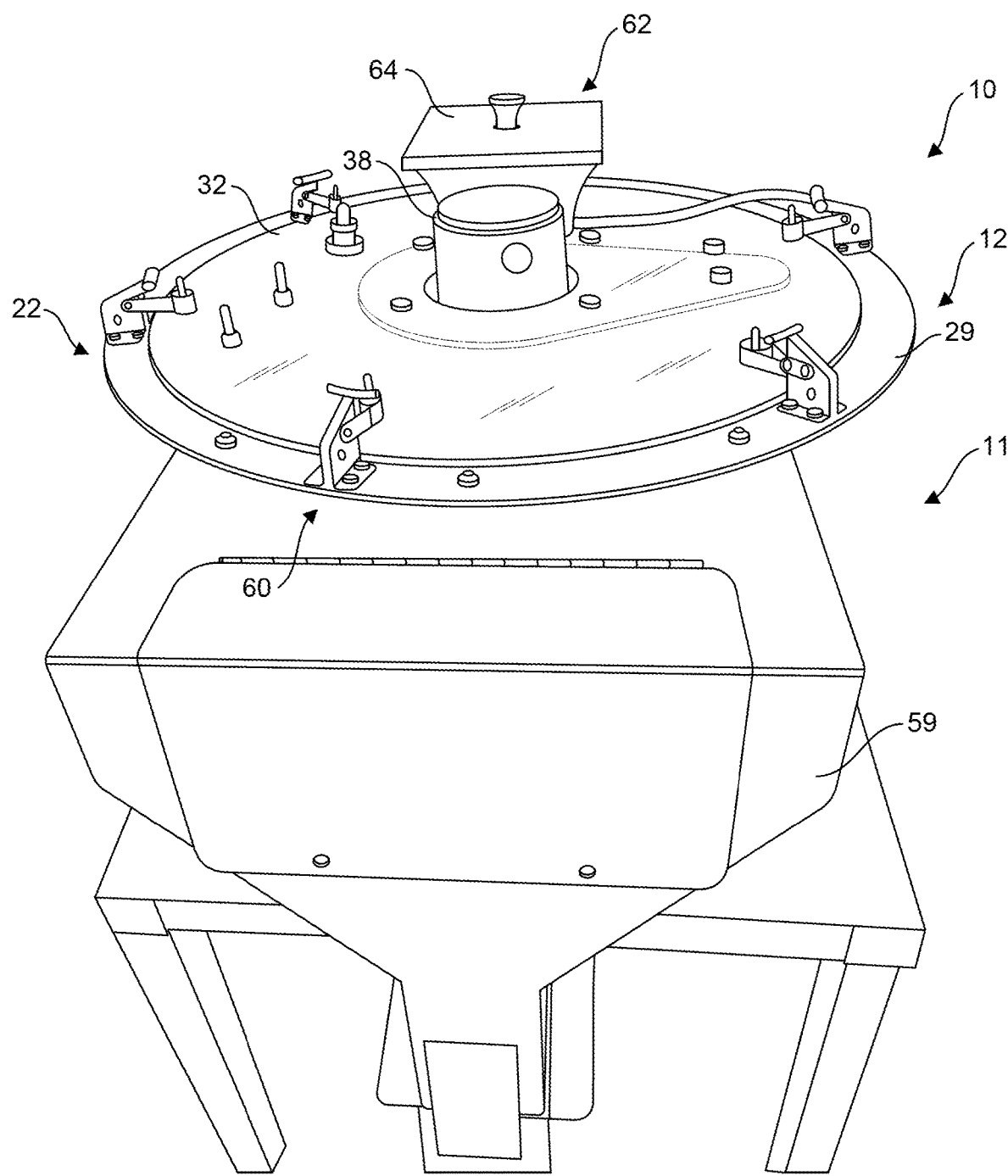
FIG. 8 is a perspective of a seed treater including the mixing bowl.

The stator 22 defines an exit opening 58 in the upper portion thereof. As described in more detail below, the exit opening 58 is configured to allow the seeds to exit the open interior 18 of the mixing bowl 12 after the treatment has been applied to the seeds (e.g., the exit opening is, broadly, in fluid communication with the open interior). As shown in FIGS. 1A and 8, the exit opening 58 is in communication with a seed collector 59 for receiving the seeds exiting the bowl 12. The lower end of the exit opening 58 is adjacent the upper end of the angular side wall 30. A door (not shown) is configured to close the exit opening 58 while the seeds and treatment are being mixed together in the open interior 18. The stator 22 also defines one or more duct fitting openings configured to receive at least a portion of one duct fitting 14. More specifically, the upper portion of the annular wall 26 defining the upper portion 18a of the open interior 18 defines the duct fitting openings. In the illustrated embodiment, the stator 22 defines four duct fitting openings to correspond to the four duct fittings 14 attached to the stator. It is understood the mixing bowl 12 may include more or less duct fittings 14 and corresponding duct fitting openings. Accordingly, the mixing bowl 12 can include more or less than one duct outlet 20 (broadly, at least one duct outlet). The duct fittings 14 are shown mounted to the stator 22 in the figures such that a portion of each duct fitting is received in a corresponding duct fitting opening. The duct fitting openings are arranged circumferentially around the upper portion of the stator 22. The duct fitting openings are spaced apart from one other around the annular wall 26.

Figure 10:
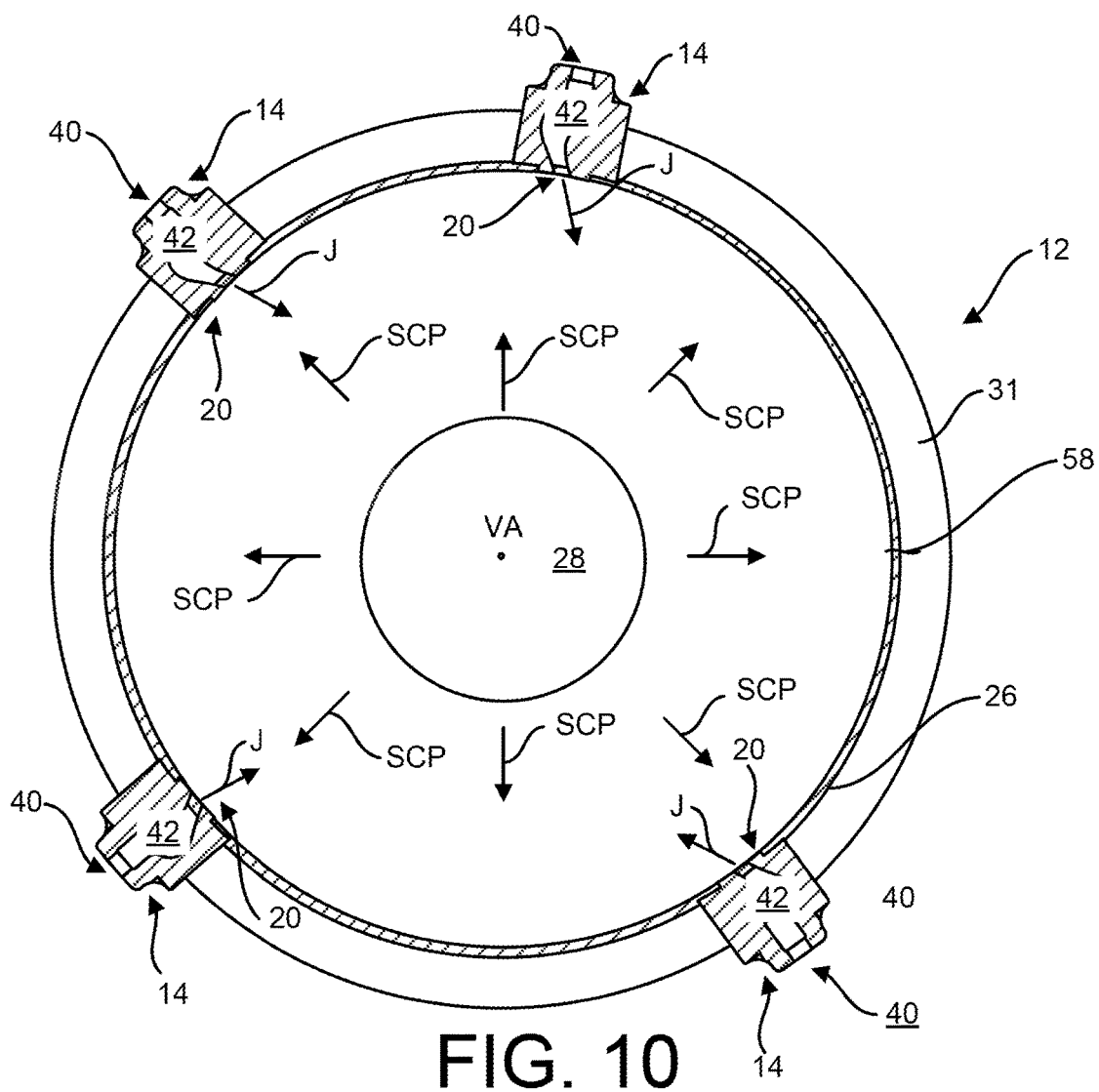
FIG. 10 is a section of the mixing bowl taken through line 10-10 of FIG. 2.

Referring to FIGS. 2-4, each duct fitting 14 is mounted to the stator 22 and defines the duct outlet 20 of the air duct 16. The duct outlet 20 of each duct fitting 14 is in fluid communication with the open interior 18 (more specifically, the upper portion 18a of the open interior). Each duct outlet 20 is configured to direct force air delivered through the air duct 16 into the upper portion 18a of the open interior 18 of the mixing bowl 12 to effectuate mixing of the seeds and treatment, as described in more detail below. The duct outlets 20 are arranged circumferentially around the upper portion of the stator 22 such that the duct outlets are spaced apart from one another. In the illustrated embodiment, the duct outlets 20 are positioned at the same height but are unevenly spaced apart circumferentially along the annular wall 26 (FIGS. 3 and 10). In other embodiments, the duct outlets 20 may be randomly positioned along the annular wall 26.

Figure 5:
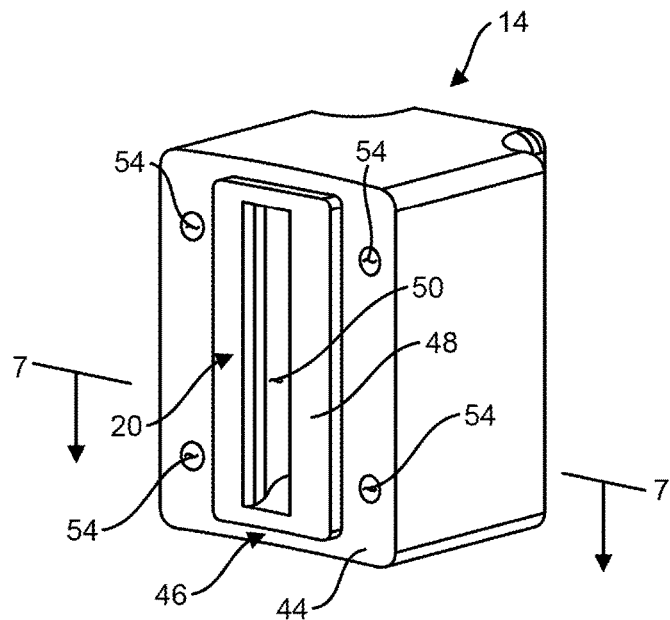
FIG. 5 is a front perspective of one of the air ducts.
Figure 6:
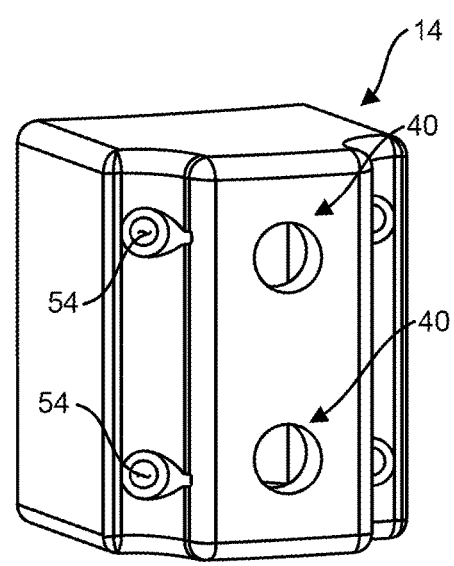
FIG. 6 is a rear perspective of the air duct.
Figure 7:
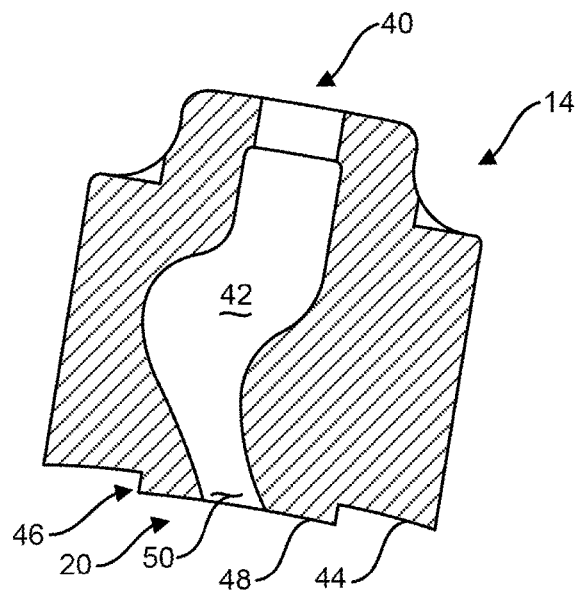
FIG. 7 is a section of the air duct taken through line 7-7 of FIG. 5.

Referring to FIGS. 5-7, each duct fitting 14 defines the duct outlet 20, at least one fitting inlet 40, and a fitting chamber 42 fluidly connecting the duct outlet and the at least one fitting inlet 40. The duct fitting 14 has an engagement surface 44 configured to engage the outer surface of the annular wall 26 when the duct fitting is attached to the stator 22. The engagement surface 44 is shaped (e.g., curved) to correspond to the shape of the outer surface of the annular wall 26. A projection 46 extends from the engagement surface 44 and has a projection surface 48 shaped (e.g., curved) to correspond to the shape of the inner surface of the annular wall 26. The distance the projection 46 extends corresponds to the thickness of the annular wall 26 (e.g., the distance between the inner and outer surfaces of the annular wall) such that when the duct fitting 14 is connected to the stator 22, the projection surface 48 is flush with the inner surface of the annular wall. The projection 26 defines the duct outlet 20 and is configured to be in a close fitting relationship with the duct fitting opening of the stator 22. In the illustrated embodiment, the duct outlet 20 is a generally rectangular shaped opening 50 (e.g., slot) extending vertically. It is understood the duct outlet 20 may have other shapes that are within the scope of the present disclosure.

In the illustrated embodiment, the duct fitting 14 includes two fitting inlets 40 on an end of the duct fitting opposite the projection 46. The fitting inlets 40 are generally circular shaped openings and are each configured to receive a connector 52 (FIG. 4). The connectors 52 are configured to be connected to the air duct 16 to fluidly connect the duct fitting 14 to the air duct (e.g., the fitting inlets 40 fluidly connect the fitting chamber 42 to the air duct). The fitting chamber 42 extends through the duct fitting 14 and fluidly connects both fitting inlets 40 to the duct outlet 20. The fitting chamber 42 has a generally wave-like or sinusoidal-like cross-sectional shape (FIG. 7). The shape of the fitting chamber 42 facilitates the mixing of the two air streams from the fitting inlets 40 to create a uniform flow of air from the duct outlet 20. When air enters the fitting chamber 42 through the fitting inlets 40, the air contacts the interior surface of the duct fitting 14 defining the fitting chamber 42 such that the air from each fitting inlet is redirected and dispersed within the mixing chamber. This results in a more uniform flow of air out of the rectangular shaped opening 50 in the open interior 18 of the mixing bowl 12. It is understood the fitting inlet 40 and/or fitting chamber 42 may have other shapes that are within the scope of the present disclosure.

The duct fitting 14 is configured to be mounted onto the stator 22. In the illustrated embodiment, the duct fitting 14 includes four bores 54 that extend through the duct fitting, each bore configured to receive a threaded rod extending radially outward from the outer surface of the annular wall 26 (FIG. 4). To mount the duct fitting 14 onto the stator 22, the duct fitting is positioned on the annular wall 26 such that the threaded rods are received in the bores 54. A nut 56 is then threaded onto each threaded rod to secure the duct fitting to the stator 22. Other ways of attaching the duct fitting 14 to the stator 22 are within the scope of the present disclosure. When the duct fitting 14 is mounted on the stator 22, the engagement surface 44 is engaging the outer surface of the annular wall 26, the projection 46 extends into the corresponding duct fitting opening, and the projection surface 48 is flush with the inner surface of the annular wall. When mounted on the stator 22, the projection 46 of the duct fitting 14 is in a close fitting relationship with duct fitting opening (e.g., the projection engages the portion of the annular wall 26 defining the duct fitting opening).

Referring to FIG. 4, the air duct 16 is fluidly connected to the mixing bowl 12. More specifically, the air duct 16 is connected to stator 22 of the mixing bowl 12 via the duct fitting 14. The air duct 16 is configured to be fluidly connected to an air mover 76 such as, but not limited to, an air compressor, a fan, a blower, a pressurized source of air or any other suitable device. The air mover 76 is configured to supply a flow of air into the open interior 18 of the mixing bowl 12. As described above, the duct fitting 14 defines the duct outlet 20 to the air duct 16 such that air driven through the air duct by the air mover 76 flows into the open interior 18 of the mixing bowl 12. In this manner, the air duct 16 extends through the stator 22 to deliver air to the open interior 18. In the illustrated embodiment, the air duct 16 comprises a plurality of air tubes 16a and air fittings 14. The air tubes 16a are elongate, flexible tubular members that define a conduit for the air to flow through. In this embodiment, the air duct 16 includes a plurality of duct outlets 20 (corresponding to each duct fitting 14) that are spaced apart from one another around the annular wall 26 of the stator 22. The duct outlets 20 may be spaced evenly or unevenly around the annular wall 26. Each duct fitting 14 is connected to two air tubes 16a with connectors 52. In one embodiment, the air tubes 16a are fluidly connected to one another upstream of the duct fittings 14 (e.g., at an end opposite the duct fitting) to at least partially define an air manifold (not shown) configured to be fluidly connected to the air mover 76. A single air manifold (e.g., air distribution component) can fluidly connect the air tubes 16a and the air mover 76 or multiple air manifolds can be used. Moreover, the air tube 16a may be fluidly connected to multiple air movers 76. The duct outlets 20 may be fluidly connect to the air mover 76 in other manners and configurations.

The various different components of the seed treater 10, such as but not limited to the mixing bowl 12, air duct 16, and air fittings 14, are all appropriately rated and constructed so that the various components are able to operate and function under the pressure created by the supply of forced air from the air mover 76. Preferably, the various components of the seed treater 10 are rated to operate under the maximum possible pressure of the forced air that can be supplied by the air mover 76, for safety reasons. However, the preferred operating pressure of the forced air supplied by the air mover 76 is only slightly higher than ambient or atmospheric pressure.

Figure 11:
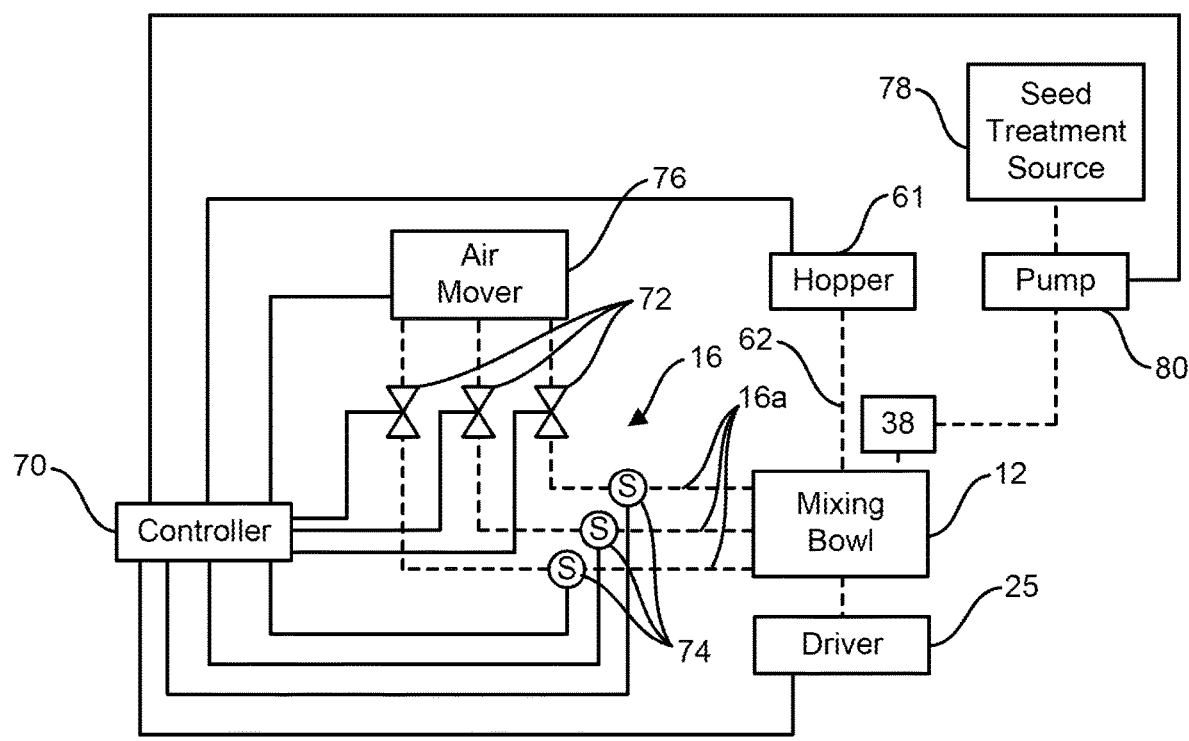
FIG. 11 is a block diagram of the seed treater.

Referring to FIG. 11, the air mover 76 may operate continuously such that a continuous flow of air is delivered to the open interior 18 or a controller 70 can be configured to selectively activate the air mover or other device to control the flow of air into the mixing bowl 12 (e.g., control the operating pressure of the forced air). In one embodiment, one or more selectively actuatable valves 72 may be fluidly connected to the air duct 16. The selectively actuatable valves 72 are fluidly connected to the air duct 16 upstream of the duct outlet 20 and are configured to regulate (e.g., control) the flow of forced air to the duct outlet. In one embodiment, a selectively actuatable valve 72 is fluidly connected to each air tube 16a to regulate the flow of air to each duct outlet 20. The controller 70 may be in communication with the one or more selectively actuatable valves 72. The controller 70 may be configured (e.g., programmed) to selectively actuate the valves 72 and thereby adjust the flow of forced air to the duct outlets 20. One or more pressure sensors 74 may be connected to the air duct 16 such that the sensors are in fluid communication with the flow (e.g., stream) of force air in the air duct upstream of the duct outlet 20. The pressure sensors 74 are configured to detect (e.g., sense) the pressure of the forced air in the air duct 16. In the preferred embodiment, each valve 72 has a corresponding pressure sensor 74 that is position upstream of the duct outlet 20 but downstream of the valve (e.g., between the duct outlet and valve) to sense the flow of force air being delivered to the duct outlet through the valve. In one embodiment, a pressure sensor 74 is connected to each air tube 16a to sense the flow of air therein. The one or more pressure sensors 74 can be in communication with the controller 70 and send signals corresponding to the sensed pressure to the controller 70. Accordingly, the controller 70, in combination with the air mover 76, the one or more pressure sensors 74 and the one or more selectively actuatable valves 72, can regulate (e.g., adjust) the flow of force air entering the open interior 18. In this manner, the controller 70 is configured (e.g., programmed) to selectively actuate the valves 72 based off signals received from the pressure sensors 74 to regulate the flow of air. It is understood that other configurations, methods and devices for regulating the flow of force air delivered to the open interior 18 are within the scope of the present disclosure. In one embodiment, the controller 70 is also configured to control the driver 25. For example, the controller 70 may be configured (e.g., programmed) to operate the driver 25 to rotate the rotor 24.

Referring to FIGS. 1 and 8, the seed treater 10 includes a lid 32 configured to be mounted on the top of the mixing bowl 12 over an open upper end of the open interior 18 (e.g., upper portion 18a). The lid 32 has a generally flat, circular shape and is configured to overlie and engage the upper flange 28 of the stator 22. The lid 32 covers the open upper end of the open interior 18 to enclose the open interior. The lid 32 is releasably secured to the mixing bowl 12 with a plurality of clamps 60 fixed to the upper flange 28 of the stator 22. The lid 32 defines a seed loading opening 34 configured to allow seeds (e.g., untreated seeds) to pass through and into the interior 18 and a treatment applicator opening 36 configured to allow a treatment applicator 38 to extend into the interior 18 to apply treatment, as explained in more detail below. The lid 32 may include an exhaust port (not shown) configured to allow the force air delivered into the open interior 18 to escape. In one embodiment, an exhaust line (not shown) fluidly connects the exhaust port to a vacuum source (not shown) and/or a collection filter (not shown) to facilitate the removal and filtration of the forced air from the open interior 18 of the mixing bowl 12. In one embodiment, the controller 70 is configured (e.g., programmed) to operate the vacuum source.

Referring to FIG. 8, a seed treatment system, as generally indicated by 11, is shown. The seed treatment system 11 includes the seed treater 10 with the mixing bowl 12, lid 32, and the seed collector 59. The seed treater 10 includes the seed treatment applicator 38 that extends into the interior 18 through the treatment applicator opening 36 in the lid 32. The seed treatment applicator 38 is configured to dispense the seed treatment into the open interior 18 of the mixing bowl 12. The seed treatment applicator 38 can dispense the seed treatment while the rotor 24 is stationary or rotating. Accordingly, the seed treatment applicator 38 can dispense treatment onto the seeds while the seeds are stationary or flowing within the open interior. The seed treatment applicator 38 is fluidly connected to a source of seed treatment 78 (FIG. 11). A pump 80 or other mover is fluidly connected to the source of seed treatment 78 and seed treatment applicator 38 to deliver the treatment to the seed treatment applicator. The controller 70 can be configured (e.g., programmed) to control the pump 80 or some other device to selectively deliver the treatment to the seed treatment applicator 38 and into the open interior 18. The seed treatment applicator 38 may be configured to deliver any suitable fluid or fluidizable treatment substance. For example, the seed treatment applicator 38 can be configured to deliver one or more of a treatment liquid, a treatment slurry, a treatment powder, etc. The seed treatment applicator 38 may also be configured to deliver two or more different treatments simultaneously. In one embodiment, the seed treatment applicator is a rotating plate suspended near the center of the open interior and configured to radially throw the treatment into the open interior 18. Other configurations of the seed treatment applicator 38 are within the scope of the present disclosure. For example, the seed treatment applicator 38 may dispense the treatment into the open interior 18 via a spray, curtain, sheet, or fan that can create a more uniform and faster initial distribution of treatment between seeds than, for example, a rotating plate. For example, in one embodiment, the seed treatment applicator 38 is a spray applicator configured to spray the seeds that have spread out over the surfaces defining the open interior (e.g., bed of seeds) via the centrifugal forces imparted by the rotor 24 to achieve a more uniform initial distribution of treatment. Still, in another embodiment, the seed treatment applicator 38 may include multiple treatment distribution heads (e.g., treatment outlets) that extend into the seeds contained within the mixing bowl 12 (e.g., seed volume) and deliver the seed treatment directly into the seed volume. Such a seed treatment applicator 38 may be desirable in large treatment loading conditions (such as 50 or more fluid ounces of treatment per 100 lbs. of seed) to achieve a high degree of initial seed-to-seed treatment uniformity. A more uniform initial distribution of treatment between seeds results in a more uniform final distribution of treatment over the seeds when the seed treating process (e.g., mixing and drying) is completed. Other configurations of the seed treatment applicator are within the scope of the present disclosure. Moreover, other devices for delivering treatments are also possible.

In the illustrated embodiment, a seed loading chute 62 extends through the seed loading opening 34 of the lid 32. The seed loading chute 62 is configured to direct seeds into the open interior 18 of the mixing bowl 12. In one embodiment, as shown in FIG. 8 the seed loading chute 62 includes a lid 64 configured to be removed such that seeds can be placed into the seed loading chute and directed (e.g., fall) into the open interior 18. In another embodiment, as shown in FIG. 1A, the seed loading chute 62 is fluidly connected to a hopper 61 that stores seeds and dispenses them into the mixing bowl 12 via the seed loading chute.

Referring to FIGS. 1-4, the illustrated seed treater 10 is configured to mix (e.g., agitate) the seeds and treatment received in the open interior 18 to evenly apply the treatment to substantially all of the seeds in the mixing bowl 12. Seed-to-seed mixing is accomplished by the random contact between seeds and the relative seed motion caused by the stream of forced air from the duct outlets 20 and the rotation of the rotor 24. The rotation of the rotor 24 by the driver 25 about the vertical axis VA moves the seeds, via centrifugal forces, radially outward along the base 28 and angular side wall 30 such that the seeds flow upward along the generally concave surface of stator to and along the inner surface of the annular wall 26 of the stator 22. The duct outlets 20 are circumferentially spaced apart along the upper portion of the stator 22 and are configured to direct a flow (e.g., stream or jet) of air from the air duct 16 into the open interior 18 to generally fluidize (e.g., move) the seeds in the upper portion 18a of the open interior to both agitate the seeds in the mixing bowl 12 to evenly distribute the treatment onto the seeds and dry the treatment to ensure proper bonding with the seeds (e.g., forced air convection). In the illustrated embodiment, the one or more duct outlets 20 direct the forced air from the air mover 76 into the upper portion 18a of the open interior 18. However, the duct outlets 20 can be configured to direct the air into the opening interior in generally any direction. Each duct outlets 20 can be configured to direct the air in the same direction relative to each respective duct fitting 14 or the duct outlets can be configured to direct the air in different directions relative to each respective duct fitting 14.

Figure 9:
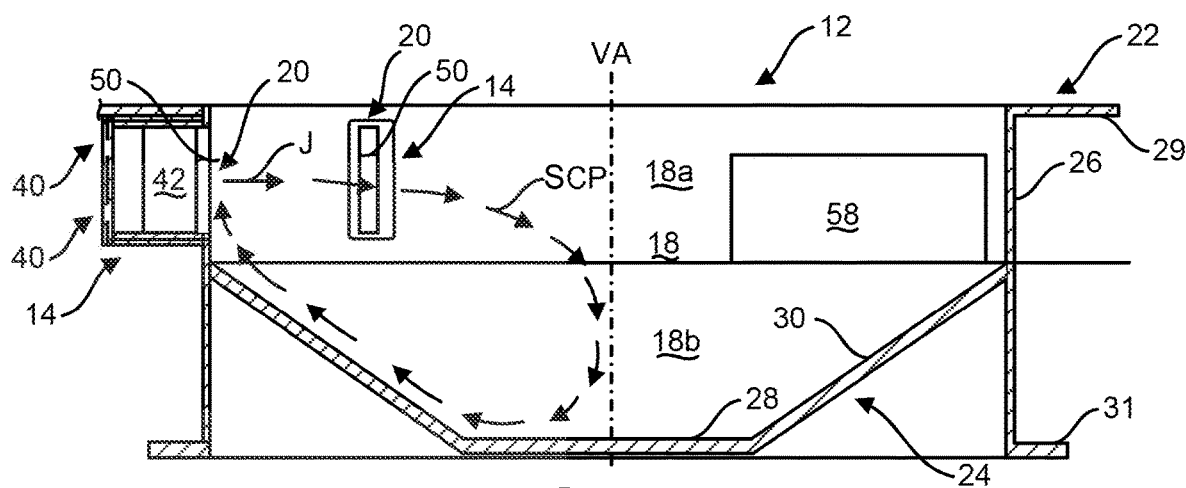
FIG. 9 is a section of the mixing bowl taken through line 9-9 of FIG. 2.

Referring to FIGS. 9 and 10, in one configuration the duct outlets 20 are configured to direct the flow of air J in a direction generally radially inward and transverse to the vertical axis VA. The flow of air J in the upper portion 18a of the open interior 18 directs (e.g., pushes) the seeds along a seed circulation path SCP that extends inward generally toward the vertical axis VA. Thus, the duct outlets 20 direct the seeds flowing in the upper portion 18a of the open interior 18 generally inward toward the vertical axis VA. The seeds, under the influence of gravity, fall downward toward the rotor 24 after being directed by the flow of air J from the duct outlets 20. Thus, the seed circulation path SCP extends downward after extending generally inward toward the vertical axis VA toward the base 28 of the rotor 24. The generally concave surface of the rotor 24 guides the seeds radially outward and upward toward the annular wall 26 and the duct outlets 20 as the rotor rotates to continuously circulate the seeds along the seed circulation path SCP. Referring to FIG. 10, the seed circulation path SCP in the rotor 24 is generally shown. The seed circulation path SCP extends radially outward from the vertical axis (e.g., rotational axis) in all directions along the concave surface of the rotor 24 toward the stator 22. Accordingly, the recirculating seed circulation path SCP (e.g., flow of seeds) extends upward along the generally concave surface of the rotor 24 and then downward from the annular wall 26 toward the base 28 (e.g., bottom) of the rotor at an inward location spaced from the annular wall. The seed circulation path SCP is defined by the rotation of the rotor 24 causing the seeds, via centrifugal forces imparted onto the seeds by the rotor, to flow radially outward toward the stator 22 and the duct outlets 20 directing the flow of air J into the upper portion 18a of the open interior 18 to move the seeds from the annular wall 26 and back into the lower portion 18b of the open interior 18 (e.g., generally radially inward toward the center of the open interior) so the process can repeat. Preferably, the controller 70 is configured to control the driver 25 and the flow of air into the open interior 18 to control the movement of the seeds so that the seeds are evenly coated with the treatment.

In the illustrated embodiment, the flow of air J directed by the duct outlets 20 is not directly toward the vertical axis VA but, instead, is in a generally inward and clockwise direction (FIG. 10). In other embodiments, the flow of air J directed by the duct outlets 20 may be directed in a generally inward and counter-clockwise direction. Still, in other embodiments, the flow of air J directed by the duct outlets 20 is not transverse to the vertical axis VA (FIG. 9) but, instead, may be in a direction that is generally downward or generally upward. Still, in other embodiments, the duct outlets 20 can be arranged to convey seeds along other seed circulation paths. For example, in one embodiment, the duct outlets 20 are arranged to continuously circulate the seeds in random directions to evenly coat and dry the seeds while the rotor 24 rotates.

The driver 25 can rotate the rotor 24 about the vertical axis VA in either a clockwise or counter-clockwise direction. In the illustrated embodiment, if the rotor 24 rotates in the clockwise direction, the flow of air J directed by the duct outlets 20 is generally in a co-current relationship with the flow of the seeds (FIG. 10). That is the flow of the seeds in the open interior 18 (specifically, the lower portion 18b) and the flow of the air J are in generally the same direction (e.g., both in the clockwise direction). It is appreciated that as the rotor 24 rotates about the vertical axis VA, the seeds will rotate about the vertical axis in the same direction as the rotor as the seeds travel radially outward and upward along the concave surface of the rotor. Conversely, if the rotor 24 rotates in the counter-clockwise direction, the flow of air J directed by the duct outlets 20 is generally in a counter-current relationship with the flow of the seeds (FIG. 10). That is the rotation of the seeds about the vertical axis VA caused by the rotor and the flow of the air J are in generally opposite directions. In other embodiments, the flow of the air directed by the duct outlets 20 is directly toward the vertical axis VA, such that regardless of the direction of rotation of the rotor 24, the flow of the air is generally in a cross-current relationship with the flow of the seeds. That is the flow of the air is generally across or transverse to the rotation of the seeds about the vertical axis VA. The direction of the flow of seeds in the open interior 18 caused by the rotor 24 relative to the direction of the forced air from the duct outlets 20 factors into the amount or severity of agitation (e.g., mixing) of the seeds and treatment in the seed treater 10. For example, a counter-current relationship will generally result in a greater degree of agitation, and therefore mixing, than a co-current relationship. Similarly, a configuration where the duct outlets 20 direct the force air into the open interior 18 in different and random directions will generally result in a greater degree of agitation than a configuration where the direction of forced air from each duct outlet 20 is generally the same (relative to the duct fitting 14). In one embodiment, the direction of the flow of air from each duct outlet 20 is adjustable such as by altering the relative orientation of the duct fitting 14 to the stator 22.

As a result of the forced air delivered to the open interior 18 through the duct outlets 20, the mixing bowl 12 does not require any baffles or similar physical components in the open interior 18 to mix the seeds. Typically, seed treaters include baffles on the stator that redirect the seeds to mix the seeds and treatment together. However, because of the nature of the treatments, which are typically liquid, over several treatment batches, the interior surface of the mixing bowl becomes coated with residual treatment—requiring periodic downtime for cleaning One place the residual treatment often builds up is at the baffles which have sharp edges and acute angles conducive to retaining treatment (e.g., spaces it is tough or impossible for seeds to move into and easy for treatment to build up in). The seed treater 10 of the current disclosure eliminates the need for baffles in the mixing bowl 12 to mix the seeds and treatment together, thereby reducing the amount of build-up of residual treatment in the mixing bowl and making the mixing bowl easier to clean (the sharp edges and acute angles of the baffles are difficult to clean). Thus, in the illustrated embodiment, the annular wall 26 of the stator 22 is free from one or more baffles. Moreover, the forced air delivered through the duct outlets 20 accelerates treatment drying time through forced air convection such that the batch cycle time (e.g., the time to go from untreated seeds to treated (e.g., coated) seeds) is reduced. However, it is understood that another embodiment of the seed treater may include both duct outlets 20 and baffles to effectuate mixing of the seeds and treatment in the open interior 18.

Referring to FIGS. 1A, 3 and 9, the seed treater 10 is configured to remove the seeds from the mixing bowl 12 after the seeds are treated. The exit opening 58 is adjacent to the upper end of the rotor 24 and is sized and arranged to permit the passing of treated seeds there-through. The seed collector 59 may be positioned next to the exit opening to receive the treated seeds. The seed collector 59 can be a seed bin, seed conveyor, bag, chute, or any other suitable seed collector. In the illustrated embodiment, a single exit opening 58 is defined by the stator 22. Other seed treaters can, however, define more than one exit opening. To discharge the treated seeds from the mixing bowl 12, the door (not shown) is opened, opening the exit opening 58, and the rotor 24 is rotated such that the seeds move up the concave surface of the rotor (e.g., the angular side wall 30), as described above, toward the upper end of the rotor and then out of the exit opening. In addition, to expedite the discharge of the treated seeds through the exit opening 58, forced air can be directed into the open interior 18 through the duct outlets 20. The force air directed into the open interior 18 will primarily escape through the exit opening 58, creating a secondary flow path whereby seeds are moved by the force air to and through the exit opening. Thus, the addition of force air facilitates and expedites discharging the seeds from the seed treater 10. In tests performed with a seed treater constructed according to the present disclosure, the discharge time was several seconds faster with forced air being directed into the open interior 18, than without force air. It is understood, that the elimination of the baffles also contributes to the faster discharging of the seeds from the seed treater 10 as well.

Referring to FIGS. 1-3, 8 and 11, a method of using the seed treater 10 of a seed treater system 11 to perform a seed treatment process will now be briefly described. Although the controller 70 is configured to control many aspects of the treatment process in the illustrated embodiment, it will be understood that in other embodiments aspects of the process can be controlled in other ways (e.g., manually, etc.). As explained above, in one embodiment, the controller 70 directs the driver 25 to rotate the rotor 24 about the vertical axis VA and regulates the forced air delivered into the open interior 18. The controller 70 may rotate the rotor 24 and deliver forced air to the open interior 18 simultaneously or intermittently. For example, in one embodiment, the controller 70 directs both the rotation of the rotor 24 and delivery of forced air through the duct outlets 20 during the application of the treatment by the seed treatment applicator 38. In another embodiment, the controller 70 only directs the rotation of the rotor 24 during the application of the treatment. It is understood the operation of the seed treater 10 described herein is exemplary and there are other ways the seed treater of the present disclosure may be operated to treat a batch of seeds with treatment.

Generally speaking, to treat a batch of seeds, a predetermined amount (e.g., 10 lbs.) of seed is loaded into the mixing bowl 12. This may be done manually or automatically via the hopper 61 operated by the controller 70, as known in the art. After receiving the seeds, the controller 70 operates the driver 25 to rotate the rotor 24 and the air mover 76 to deliver forced air through the duct outlets 20. As a result, the seeds flow along the seed circulation path SCP. Once all the seeds are flowing (e.g., moving) within the open interior 18, the controller 70 operates the seed treatment applicator 38 and dispenses a predetermined amount of treatment (e.g., 4 fl. oz.) into the interior and onto the seeds. Simultaneously introducing the treatment while both the rotor 24 is rotating and forced air is being delivered into the interior 18 creates a generally uniform initial distribution of treatment. After treatment application, the controller 70 continues to control the rotation of the rotor 24 and the delivery of force air to continuously mix (e.g., agitate) the seeds and treatment within the mixing bowl 12 to evenly apply the treatment to the seeds (e.g., evenly coat the seeds). In addition, the continuous stream of air flow from the duct outlets 20 dries the seeds in the interior 18 via forced convection. Once the treatment is applied to the seeds (e.g., dried on the seeds), the door (not shown) is opened (manually or by the controller 70) and the seeds are discharged from the mixing bowl 12, in the manner described above. The controller 70 may mix the seeds and treatment together for a predetermined period of time to ensure the treatment has coated and dried on the seeds before discharging or an operator can instruct the controller to discharge the seeds, through a user interface, after determining the treatment process is completed.

In one or more embodiments, the seed treater 10 can apply a plurality of different treatment layers to the seeds. For example, the seed treater 10 can apply a first layer of a first seed treatment and a second layer of a second seed treatment, but other embodiments can be configured to coat the seeds with more than two layers and/or more than two treatment components. To treat the seeds with multiple treatments, the seed treater 10 delivers a first seed treatment through the seed treatment applicator 38 onto the seeds in the open interior 18. As described above, the seed treater 10 is then operated to uniformly coat and dry the first seed treatment onto the seeds. Then, a second seed treatment is delivered through the seed treatment applicator 38 onto the seeds. The seed treater 10 then continues to operate to uniformly coat and dry the second seed treatment over the first seed treatment layer. In another embodiment, the seed treater 10 can deliver multiple seed treatments simultaneously onto the seeds. For example, the seed treatment applicator 38 can deliver two seed treatments, a liquid treatment and a power treatment, that mix together in the open interior 18 and coat the seeds.

Seed Treatments

In some embodiments, the seed treatment component comprises a seed treatment active, such as a biological agent and/or agrochemical. In some embodiments, the seed treatment component comprises a seed-finishing agent suitable for enhancing one or more physical properties of the exterior surfaces of the seeds. The seed treatment component may be applied in a dry state or a wet state (e.g., slurry).

Seed Treatment Active

In the compositions described herein, the seed treatment component may comprise a seed treatment active comprising one or more biological agents and/or agrochemicals. Seed treatment active is defined herein to include both seed treatment material and seed applied material. After being contacted by the seed treatment active (seed applied material or seed treated material), for purposes herein, the seeds are referred to as "treated seeds."

In some embodiments, the seed treatment active comprises one or more pesticidal agents. Pesticidal agents include chemical pesticides and biopesticides or biocontrol agents. Various types of chemical pesticides and biopesticides include acaricides, insecticides, nematicides, fungicides, gastropodicides, herbicides, virucides, bactericides, and combinations thereof. Biopesticides or biocontrol agents may include bacteria, fungi, beneficial nematodes, and viruses that exhibit pesticidal activity.

Acaricides, Insecticides and/or Nematicides

In some embodiments, the seed treatment active comprises one or more chemical acaricides, insecticides, and/or nematicides. Non-limiting examples of chemical acaricides, insecticides, and/or nematicides may include one or more carbamates, diamides, macrocyclic lactones, neonicotinoids, organophosphates, phenylpyrazoles, pyrethrins, spinosyns, synthetic pyrethroids, tetronic acids and/or tetramic acids. Non-limiting examples of chemical acaricides, insecticides and nematicides that can be useful in compositions of the present disclosure include abamectin, acrinathrin, aldicarb, aldoxycarb, alpha-cypermethrin, be tacyfluthrin, bifenthrin, cyhalothrin, cypermethrin, deltamethrin, esfenvalerate, etofenprox, fenpropathrin, fenvalerate, flucythrinate, fosthiazate, lambda-cyhalothrin, gamma-cyhalothrin, permethrin, tau-fluvalinate, transfluthrin, zeta-cypermethrin, cyfluthrin, bifenthrin, tefluthrin, eflusilanat, fubfenprox, pyrethrin, resmethrin, imidacloprid, acetamiprid, thiamethoxam, nitenpyram, thiacloprid, dinotefuran, clothianidin, chlorfluazuron, diflubenzuron, lufenuron, teflubenzuron, triflumuron, novaluron, flufenoxuron, hexaflumuron, bistrifluoron, noviflumuron, buprofezin, cyromazine, methoxyfenozide, tebufenozide, halofenozide, chromafenozide, endosulfan, fipronil, ethiprole, pyrafluprole, pyriprole, flubendiamide, chlorantraniliprole (e.g., *Rynaxypyr*), cyazypyr, emamectin, emamectin benzoate, abamectin, ivermectin, milbemectin, lepimectin, tebufenpyrad, fenpyroximate, pyridaben, fenazaquin, pyrimidifen, tolfenpyrad, dicofol, cyenopyrafen, cyflumetofen, acequinocyl, fluacrypyrin, bifenazate, diafenthiuron, etoxazole, clofentezine, spinosad, triarathen, tetradifon, propargite, hexythiazox, bromopropylate, chinomethionat, amitraz, pyrifluquinazon, pymetrozine, flonicamid, pyriproxyfen, diofenolan, chlorfenapyr, metaflumizone, indoxacarb, chlorpyrifos, spirodiclofen, spiromesifen, spirotetramat, pyridalyl, spinctoram, acephate, triazophos, profenofos, oxamyl, spinetoram, fenamiphos, fenamipclothiahos, 4-{[(6-chloropyrid-3-yl)methyl](2,2-difluoroethyl) amino} furan-2(5H)-one, 3,5-disubstituted-1,2,4-oxadiazole compounds, 3-phenyl-5-(thien-2-yl)-1,2,4-oxadiazole, cadusaphos, carbaryl, carbofuran, ethoprophos, thiodicarb, aldicarb, aldoxycarb, metamidophos, methiocarb, sulfoxaflor, methamidophos, cyantraniliprole and tioxazofen and combinations thereof. Additional non-limiting examples of chemical acaricides, insecticides, and/or nematicides may include one or more of abamectin, aldicarb, aldoxycarb, bifenthrin, carbofuran, chlorantraniliporle, chlothianidin, cyfluthrin, cyhalothrin, cypermethrin, cyantraniliprole, dinotefuran, emamectin, ethiprole, fenamiphos, fipronil, flubendiamide, fosthiazate, imidacloprid, ivermectin, lambda-cyhalothrin, milbemectin, nitenpyram, oxamyl, permethrin, spinetoram, spinosad, spirodichlofen, spirotetramat, tefluthrin, thiacloprid, thiamethoxam, tioxazofen and/or thiodicarb, and combinations thereof.

Additional non-limiting examples of acaricides, insecticides and nematicides that may be included or used in compositions in some embodiments may be found in Steffey and Gray, *Managing Insect Pests*, ILLINOIS AGRONOMY HANDBOOK (2008); and Niblack, *Nematodes*, ILLINOIS AGRONOMY HANDBOOK (2008), the contents and disclosures of which are incorporated herein by reference. Non-limiting examples of commercial insecticides which may be suitable for the compositions disclosed herein include CRUISER (Syngenta, Wilmington, Delware), GAUCHO and PONCHO (Gustafson, Plano, Texas). Active ingredients in these and other commercial insecticides may include thiamethoxam, clothianidin, and imidacloprid. Commercial acaricides, insecticides, and/or nematicides may be used in accordance with a manufacturer's recommended amounts or concentrations.

In some embodiments, the seed treatment active comprises one or more biopesticidal agents the presence and/or output of which is toxic to an acarid, insect and/or nematode. For example, the seed treatment active may comprise one or more of *Bacillus firmus* I-1582, *Bacillus mycoides* AQ726, NRRL B-21664; *Beauveria bassiana* ATCC-74040, *Beauveria bassiana* ATCC-74250, *Burkholderia* sp. A396 sp. nov. rinojensis, NRRL B-50319, *Chromobacterium subtsugae* NRRL B-30655, *Chromobacterium vaccinii* NRRL B-50880, *Flavobacterium* H492, NRRL B-50584, *Metarhizium anisopliae* F52 (also known as *Metarhizium anisopliae* strain 52, *Metarhizium anisopliae* strain 7, *Metarhizium anisopliae* strain 43, and/or Metarhizium anisopliae BIO-1020, TAE-001; deposited as DSM 3884, DSM 3885, ATCC 90448, SD 170 and ARSEF 7711), *Paecilomyces fumosoroseus* FE991, and combinations thereof.

Fungicides

In some embodiments, the seed treatment active comprises one or more chemical fungicides. Non-limiting examples of chemical fungicides may include one or more aromatic hydrocarbons, benzthiadiazole, carboxylic acid amides, morpholines, phenylamides, phosphonates, thiazolidines, thiophene, quinone outside inhibitors and strobilurins, such as azoxystrobin, coumethoxystrobin, coumoxystrobin, dimoxystrobin, enestroburin, fluoxastrobin, kresoxim-methyl, metominostrobin, orysastrobin, picoxystrobin, pyraclostrobin, pyrametostrobin, pyraoxystrobin, pyribencarb, trifloxystrobin, 2-[2-(2,5-dimethyl-phenoxymethyl)-phenyl]-3-methoxy-acrylic acid methyl ester, and 2-(2-(3-(2,6-dichlorophenyl)-1-methyl-allylideneaminooxymethyl)-phenyl)-2-methoxyimino-N-methyl-acetamide, carboxamides, such as carboxanilides (e.g., benalaxyl, benalaxyl-M, benodanil, bixafen, boscalid, carboxin, fenfuram, fenhexamid, flutolanil, fluxapyroxad, furametpyr, isopyrazam, isotianil, kiralaxyl, mepronil, metalaxyl, metalaxyl-M (mefenoxam), ofurace, oxadixyl, oxycarboxin, penflufen, penthiopyrad, sedaxane, tecloftalam, thifluzamide, tiadinil, 2-amino-4-methyl-thiazole-5-carboxanilide, N-(4'-trifluoromethylthiobiphenyl-2-yl)-3-difluoromethyl-1-methyl-1H -pyra-zole-4-carboxamide, N-(2-(1,3,3-trimethylbutyl)-phenyl)-1,3-dimethyl-5-fluoro-1H-pyrazole-4-carboxamide), carboxylic morpholides (e.g., dimethomorph, flumorph, pyrimorph), benzoic acid amides (e.g., flumetover, fluopicolide, fluopyram, zoxamide), carpropamid, dicyclomet, mandiproamid, fenehexamid, oxytetracyclin, silthiofam, and N-(6-methoxy-pyridin-3-yl) cyclopropanecarboxylic acid amide, spiroxamine, azoles, such as triazoles (e.g., azaconazole, bitertanol, bromuconazole, cyproconazole, difenoconazole, diniconazole, diniconazole-M, epoxiconazole, fenbuconazole, fluquinconazole, flusilazole, flutriafol, hexaconazole, imibenconazole, ipconazole, metconazole, myclobutanil, oxpoconazole, paclobutrazole, penconazole, propiconazole, prothioconazole, simeconazole, tebuconazole, tetraconazole, triadimefon, triadimenol, triticonazole, uniconazole) and imidazoles (e.g., cyazofamid, imazalil, pefurazoate, prochloraz, triflumizol); heterocyclic compounds, such as pyridines (e.g., fluazinam, pyrifenox (cf.D1b), 3-[5-(4-chloro-phenyl)-2,3-dimethyl-isoxazolidin-3-yl]-pyridine, 3-[5-(4-methyl-phenyl)-2,3-dimethyl-isoxazolidin-3-yl]-pyridine), pyrimidines (e.g., bupirimate, cyprodinil, diflumetorim, fenarimol, ferimzone, mepanipyrim, nitrapyrin, nuarimol, pyrimethanil), piperazines (e.g., triforine), pyrroles (e.g., fenpiclonil, fludioxonil), morpholines(e.g., aldimorph, dodemorph, dodemorph-acetate, fenpropimorph, tridemorph), piperidines (e.g., fenpropidin); dicarboximides (e.g., fluoroimid, iprodione, procymidone, vinclozolin), non-aromatic 5-membered heterocycles (e.g., famoxadone, fenamidone, flutianil, octhilinone, probenazole, 5-amino-2-isopropyl-3-oxo-4-ortho-tolyl-2,3-dihydropyrazole-1-carbothioic acid S-allyl ester), acibenzolar-S-methyl, ametoctradin, amisulbrom, anilazin, blasticidin-S, captafol, captan, chinomethionat, dazomet, debacarb, diclomezine, difenzoquat, difenzoquat-methylsulfate, fenoxanil, folpet, oxolinic acid, piperalin, proquinazid, pyroquilon, quinoxyfen, triazoxide, tricyclazole, 2-butoxy-6-iodo-3-propylchromen-4-one, 5-chloro-1-(4,6-dimethoxy-pyrimidin-2-yl)-2-methyl-1H-benzoimidazole and 5-chloro-7-(4-methylpiperidin-1-yl)-6-(2,4,6-trifluorophenyl)-[1,2,4]triazolo-[1,5-a]lpyrimidine; benzimidazoles, such as carbendazim; and other active substances, such as guanidines (e.g., guanidine, dodine, dodine free base, guazatine, guazatine-acetate, iminoctadine), iminoctadine-triacetate and iminoctadine-tris(albesilate); antibiotics (e.g., kasugamycin, kasugamycin hydrochloride-hydrate, streptomycin, polyoxine and validamycin A), nitrophenyl derivates (e.g., binapacryl, dicloran, dinobuton, dinocap, nitrothal-isopropyl, tecnazen). organometal compounds (e.g., fentin salts, such as fentin-acetate, fentin chloride, fentin hydroxide); sulfur-containing heterocyclyl compounds (e.g., dithianon, isoprothiolane), organophosphorus compounds (e.g., edifenphos, fosetyl, iprobenfos, phosphorus acid and its salts, pyrazophos, tolclofos-methyl), organochlorine compounds (e.g., chlorothalonil, dichlofluanid, dichlorophen, flusulfamide, hexachlorobenzene, pencycuron, pentachlorphenole and its salts, phthalide, quintozene, thiophanate-methyl, thiophanates, tolylfluanid, N-(4-chloro-2-nitro-phenyl)-N-ethyl-4-methyl-benzenesulfonamide) and inorganic active substances (e.g., Bordeaux mixture, copper acetate, copper hydroxide, copper oxychloride, basic copper sulfate, sulfur) and combinations thereof. In an aspect, the seed treatment active comprises comprise acibenzolar-S-methyl, azoxystrobin, benalaxyl, bixafen, boscalid, carbendazim, cyproconazole, dimethomorph, epoxiconazole, fludioxonil, fluopyram, fluoxastrobin, flutianil, flutolanil, fluxapyroxad, fosetyl-Al, ipconazole, isopyrazam, kresoxim-methyl, mefenoxam, metalaxyl, metconazole, myclobutanil, orysastrobin, penflufen, penthiopyrad, picoxystrobin, propiconazole, prothioconazole, pyraclostrobin, sedaxane, silthiofam, tebuconazole, thiabendazole, thifluzamide, thiophanate, tolclofos-methyl, trifloxystrobin and triticonazole, and combinations thereof.

For additional examples of fungicides that may be included in the seed treatment active compositions in some embodiments see, e.g., Bradley, *Managing Diseases*, ILLINOIS AGRONOMY HANDBOOK (2008), the content and disclosure of which are incorporated herein by reference. Fungicides useful for compositions in some embodiments may exhibit activity against one or more fungal plant pathogens, including but not limited to Phytophthora, Rhizoctonia, Fusarium, Pythium, Phomopsis, Selerotinia or Phakopsora, and combinations thereof. Non-limiting examples of commercial fungicides which may be suitable for the compositions in some embodiments include PROTEGE, RIVAL or ALLEGIANCE FL or LS (Gustafson, Plano, Texas), WARDEN RTA (Agrilance, St. Paul, Minnesota), APRON XL, APRON MAXX RTA or RFC, MAXIM 4FS or XL (Syngenta, Wilmington, Delaware), CAPTAN (Arvesta, Guelph, Ontario) and PROTREAT (Nitragin Argentina, Buenos Ares, Argentina). Active ingredients in these and other commercial fungicides include, but are not limited to, fludioxonil, mefenoxam, azoxystrobin and metalaxyl. Commercial fungicides may be used in accordance with a manufacturer's recommended amounts or concentrations.

In some embodiments, the seed treatment active comprises one or more biopesticidal agents the presence and/or output of which is toxic to at least one fungus and/or bacteria. For example, the seed treatment active may comprise one or more of *Ampelomyces quisqualis* AQ 100 (Intrachem Bio GmbH & Co. KG, Germany), *Aspergillus flavus* AFLA-GUARD® (Syngenta Crop Protection, Inc., CH), *Aureobasidium pullulans* BOTECTOR® (bio-ferm GmbH, Germany), *Bacillus pumilus* AQ717 (NRRL B-21662), *Bacillus pumilus* NRRL B-30087, *Bacillus* AQ175 (ATCC 55608), *Bacillus* AQ177 (ATCC 55609), *Bacillus subtilis* AQ713 (NRRL B-21661), *Bacillus subtilis* AQ743 (NRRL B-21665), *Bacillus amyloliquefaciens* FZB24, *Bacillus amyloliquefaciens* FZB42, *Bacillus amyloliquefaciens* NRRL B-50349, *Bacillus subtilis* ATCC 55078, *Bacillus subtilis* ATCC 55079, *Bacillus thuringiensis* AQ52 (NRRL B-21619), *Candida oleophila* I-182 (e.g., ASPIRE® from Ecogen Inc., USA), *Candida saitoana* BIO-CURE® (in mixture with lysozyme; BASF, USA) and BIOCOAT® (ArystaLife Science, Ltd., Cary, NC), *Clonostachys rosea* f. *catenulata* (also referred to as *Gliocladium catenulatum*) J1446(PRESTOP®, Verdera, Finland), *Coniothyrium minitans* CONTANS® (Prophyta, Germany), *Cryphonectria parasitica* (CNICM, France), *Cryptococcus albidus* YIELD PLUS® (Anchor Bio-Technologies, South Africa), *Fusarium oxysporum* BIOFOX® (from S.I.A.P.A., Italy) and FUSACLEAN® (Natural Plant Protection, France), *Metschnikowia fructicola* SHEMER® (Agrogreen, Israel), *Microdochium dimerum* ANTIBOT® (Agrauxine, France), *Muscodor albus* NRRL 30547, *Muscodor roseus* NRRL 30548, *Phlebiopsis gigantea* ROTSOP® (Verdera, Finland), *Pseudozyma flocculosa* SPORODEX® (Plant Products Co. Ltd., Canada), *Pythium oligandrum* DV74 (POLYVERSUM®, Remeslo SSRO, Biopreparaty, Czech Rep.), *Reynoutria sachlinensis* (e.g., REGALIA® from Marrone BioInnovations, USA), *Streptomyces* NRRL B-30145, *Streptomyces* M1064, *Streptomyces galbus* NRRL 30232, *Streptomyces lydicus* WYEC 108 (ATCC 55445), *Streptomyces violaceusniger* YCED 9 (ATCC 55660; DE-THATCH-9®, DECOMP-9® and THATCH CONTROL®, Idaho Research Foundation, USA), *Streptomyces* WYE 53 (ATCC 55750; DE-THATCH-9®, DECOMP-9® and THATCH CONTROL®, Idaho Research Foundation, USA), *Talaromyces flavus* V117b (PROTUS®, Prophyta, Germany), *Trichoderma asperellum* SKT-1 (ECO-HOPE®, Kumiai Chemical Industry Co., Ltd., Japan), *Trichoderma atroviride* LC52 (SENTINEL®, Agrimm Technologies Ltd, NZ), *Trichoderma harzianum* T-22 (PLANTSHIELD®, der Firma BioWorks Inc., USA), *Trichoderma harzianum* TH-35 (ROOT PRO®, from Mycontrol Ltd., Israel), *Trichoderma harzianum* T-39 (TRICHODEX®, Mycontrol Ltd., Israel; TRICHODERMA 2000®, Makhteshim Ltd., Israel), *Trichoderma harzianum* ICC012 and *Trichoderma viride* TRICHOPEL (Agrimm Technologies Ltd, NZ), *Trichoderma harzianum* ICC012 and *Trichoderma viride* ICC080 (REMEDIER® WP, Isagro Ricerca, Italy), *Trichoderma polysporum* and *Trichoderma harzianum* (BINAB®, BINAB Bio-Innovation AB, Sweden), *Trichoderma stromaticum* TRICOVAB® (C.E.P.L.A.C., Brazil), *Trichoderma virens* GL-21 (SOILGARD®, Certis LLC, USA), and combinations thereof.

Herbicides

In some embodiments, the seed treatment active comprises one or more suitable chemical herbicides. The herbicides may be a pre-emergent herbicide, a post-emergent herbicide, or a combination thereof. Non-limiting examples of chemical herbicides may comprise one or more acetyl CoA carboxylase (ACCase) inhibitors, acetolactate synthase (ALS) inhibitors, acetanilides, acetohydroxy acid synthase (AHAS) inhibitors, photosystem II inhibitors, photosystem I inhibitors, protoporphyrinogen oxidase (PPO or Protox) inhibitors, carotenoid biosynthesis inhibitors, enolpyruvyl-shikimate-3-phosphate (EPSP) synthase inhibitors, glutamine synthetase inhibitors, dihydropteroate synthetase inhibitors, mitosis inhibitors, 4-hydroxyphenyl-pyruvate-dioxygenase (4-HPPD) inhibitors, synthetic auxins, auxin herbicide salts, auxin transport inhibitors, nucleic acid inhibitors and/or one or more salts, esters, racemic mixtures and/or resolved isomers thereof. Non-limiting examples of chemical herbicides that can be useful in compositions of the present disclosure include 2,4-dichlorophenoxyacetic acid (2,4-D), 2,4,5-trichlorophenoxyacetic acid (2,4,5-T), ametryn, amicarbazone, aminocyclopyrachlor, acetochlor, acifluorfen, alachlor, atrazine, azafenidin, bentazon, benzofenap, bifenox, bromacil, bromoxynil, butachlor, butafenacil, butroxydim, carfentrazone-ethyl, chlorimuron, chlorotoluro, clethodim, clodinafop, clomazone, cyanazine, cycloxydim, cyhalofop, desmedipham, desmetryn, dicamba, diclofop, dimefuron, diflufenican, diuron, dithiopyr, ethofumesate, fenoxaprop, foramsulfuron, fluazifop, fluazifop-P, flufenacet, fluometuron, flufenpyr-ethyl, flumiclorac, flumiclorac-pentyl, flumioxazin, fluoroglycofen, fluthiacet-methyl, fomesafen, glyphosate, glufosinate, halosulfuron, haloxyfop, hexazinone, iodosulfuron, indaziflam, imazamox, imazaquin, imazethapyr, ioxynil, isoproturon, isoxaflutole, lactofen, linuron, mecoprop, mecoprop-P, mesosulfuron, mesotrion, me tamitron, metazochlor, methibenzuron, metolachlor (and S-metolachlor), metoxuron, metribuzin, monolinuron, oxadiargyl, oxadiazon, oxaziclomefone, oxyfluorfen, phenmedipham, pretilachlor, profoxydim, prometon, prometrn, propachlor, propanil, propaquizafop, propisochlor, propoxycarbazone, pyraflufen-ethyl, pyrazon, pyrazolynate, pyrazoxyfen, pyridate, quizalofop, quizalofop-P (e.g., quizalofop-ethyl, quizalofop-P-ethyl, clodinafop-propargyl, cyhalofop-butyl, diclofop-methyl, fenoxaprop-P-ethyl, fluazifop-P-butyl, haloxyfop-methyl, haloxyfop-R-methyl), saflufenacil, sethoxydim, siduron, simazine, simetryn, sulcotrione, sulfentrazone, tebuthiuron, tembotrione, tepraloxydim, terbacil, terbumeton, terbuthylazine, thaxtomin (e.g., the thaxtomins described in U.S. Pat. No. 7,989,393), thiencarbazone-methyl, thenylchlor, tralkoxydim, triclopyr, trietazine, trifloxysulfuron, tropramezone, salts and esters thereof; racemic mixtures and resolved isomers thereof and combinations thereof. In an embodiment, seed treatment active compositions comprise acetochlor, clethodim, dicamba, flumioxazin, fomesafen, glyphosate, glufosinate, mesotrione, quizalofop, saflufenacil, sulcotrione, S-3100 and/or 2,4-D, and combinations thereof.

Additional examples of herbicides that may be included in compositions in some embodiments may be found in Hager, *Weed Management*, Illinois Agronomy Handbook (2008); and Loux et al., Weed Control Guide for Ohio, Indiana and Illinois (2015), the contents and disclosures of which are incorporated herein by reference. Commercial herbicides may be used in accordance with a manufacturer's recommended amounts or concentrations.

In some embodiments, the seed treatment active comprises one or more biopesticidal agents the presence and/or output of which is toxic to at least one plant, including for example, weeds. Examples of biopesticides that may be included or used in compositions in some embodiments may be found in BURGES, *supra*; HALL & MENN, BIOPESTICIDES: USE AND DELIVERY (Humana Press) (1998); McCoy et al., *Entomogenous fungi*, in CRC HANDBOOK OF NATURAL PESTICIDES. MICROBIAL PESTICIDES, PART A. ENTOMOGENOUS PROTOZOA AND FUNGI (C. M. Inoffo, ed.), Vol. 5:151-236 (1988); SAMSON et al., ATLAS OF ENTOMOPATHOGENIC FUNGI (Springer-Verlag, Berlin) (1988); and deFaria and Wraight, *Mycoinsecticides and Mycoacaricides:A comprehensive list with worldwide coverage and international classification of formulation types*, BIOL. CONTROL (2007), the contents and disclosures of which are incorporated herein by reference.

Additional Agents

In some embodiments, the seed treatment active comprises one or more additional agent.

In some embodiments, the seed treatment active comprises one or more beneficial biostimulants and/or microbial inoculants. Biostimulants or inoculants may enhance ion uptake, nutrient uptake, nutrient availability or delivery, or a combination thereof. Non-limiting examples of biostimulants or inoculants that may be included or used in compositions may include bacterial extracts (e.g., extracts of one or more diazotrophs, phosphate-solubilizing microorganisms and/or biopesticides), fungal extracts, humic acids (e.g., potassium humate), fulvic acids, myo-inositol, and/or glycine, and any combinations thereof. According to some embodiments, the biostimulants or inoculants may comprise one or more *Azospirillum* (e.g., an extract of media comprising *A. brasilense* INTA Az-39), one or more Bradyrhizobium (e.g., an extract of media comprising *B. elkanii* SEMIA 501, *B. elkanii* SEMIA 587, *B. elkanii* SEMIA 5019, *B. japonicum* NRRL B-50586 (also deposited as NRRL B-59565), *B. japonicum* NRRL B-50587 (also deposited as NRRL B-59566), *Bacillus amyloliquefaciens* TJ1000 (also known as 1BE, isolate ATCC BAA-390), *B. japonicum* NRRL B-50588 (also deposited as NRRL B-59567), *B. japonicum* NRRL B-50589 (also deposited as NRRL B-59568), *B. japonicum* NRRL B-50590 (also deposited as NRRL B-59569), *B. japonicum* NRRL B-50591 (also deposited as NRRL B-59570), *Trichoderma virens* G1-3 (ATCC 57678), *Trichoderma virens* G1-21 (Thermo Trilogy Corporation, Wasco, CA), *Trichoderma virens* G1-3 and *Bacillus amyloliquefaciens* FZB24, *Trichoderma virens* G1-3 and *Bacillus amyloliquefaciens* NRRL B-50349, *Trichoderma virens* G1-3 and *Bacillus amyloliquefaciens* TJ1000, *Trichoderma virens* G1-21 and *Bacillus amyloliquefaciens* FZB24, *Trichoderma virens* G1-21 and *Bacillus amyloliquefaciens* NRRL B-50349, *Trichoderma virens* G1-21 and *Bacillus amyloliquefaciens* TJ1000, *Trichoderma viride* TRIECO® (Ecosense Labs. (India) Pvt. Ltd., India, BIO-CURE® F from T. Stanes & Co. Ltd., Indien), *Trichoderma viride* TV1 (Agribiotec srl, Italy), *Trichoderma viride* ICC080, and/or *Ulocladium oudemansii* HRU3 (BOTRY-ZEN®, Botry-Zen Ltd, NZ), *B. japonicum* NRRL B-50592 (also deposited as NRRL B-59571), *B. japonicum* NRRL B-50593 (also deposited as NRRL B-59572), *B. japonicum* NRRL B-50594 (also deposited as NRRL B-50493), *B. japonicum* NRRL B-50608, *B. japonicum* NRRL B-50609, *B. japonicum* NRRL B-50610, *B. japonicum* NRRL B-50611, *B. japonicum* NRRL B-50612, *B. japonicum* NRRL B-50726, *B. japonicum* NRRL B-50727, *B. japonicum* NRRL B-50728, *B. japonicum* NRRL B-50729, *B. japonicum* NRRL B-50730, *B. japonicum* SEMIA 566, *B. japonicum* SEMIA 5079, *B. japonicum* SEMIA 5080, *B. japonicum* USDA 6, *B. japonicum* USDA 110, *B. japonicum* USDA 122, *B. japonicum* USDA 123, *B. japonicum* USDA 127, *B. japonicum* USDA 129 and/or *B. japonicum* USDA 532C), one or more *Rhizobium* extracts (e.g., an extract of media comprising *R. leguminosarum* SO12A-2), one or more *Sinorhizobium* extracts (e.g., an extract of media comprising *S. fredii* CCBAU114 and/or *S. fredii* USDA 205), one or more *Penicillium* extracts (e.g., an extract of media comprising *P. bilaiae* ATCC 18309, *P. bilaiae* ATCC 20851, *P. bilaiae* ATCC 22348, *P. bilaiae* NRRL 50162, *P. bilaiae* NRRL 50169, *P. bilaiae* NRRL 50776, *P. bilaiae* NRRL 50777, *P. bilaiae* NRRL 50778, *P. bilaiae* NRRL 50777, *P. bilaiae* NRRL 50778, *P. bilaiae* NRRL 50779, *P. bilaiae* NRRL 50780, *P. bilaiae* NRRL 50781, *P. bilaiae* NRRL 50782, *P. bilaiae* NRRL 50783, *P. bilaiae* NRRL 50784, *P. bilaiae* NRRL 50785, *P. bilaiae* NRRL 50786, *P. bilaiae* NRRL 50787, *P. bilaiae* NRRL 50788, *P. bilaiae* RS7B-SD1, *P. brevicompactum* AgRF18, *P. canescens* ATCC 10419, *P. expansum* ATCC 24692, *P. expansum* YT02, *P. fellatanum* ATCC 48694, *P. gaestrivorus* NRRL 50170, *P. glabrum* DAOM 239074, *P. glabrum* CBS 229.28, *P. janthinellum* ATCC 10455, *P. lanosocoeruleum* ATCC 48919, *P. radicum* ATCC 201836, *P. radicum* FRR 4717, *P. radicum* FRR 4719, *P. radicum* N93/47267 and/or *P. raistrickii* ATCC 10490), one or more *Pseudomonas* extracts (e.g., an extract of media comprising *P. jessenii* PS06), one or more acaricidal, insecticidal and/or nematicidal extracts (e.g., an extract of media comprising *Bacillus firmus* 1-1582, *Bacillus mycoides* AQ726, NRRL B-21664; *Beauveria bassiana* ATCC-74040, *Beauveria bassiana* ATCC-74250, *Burkholderia* sp. A396 sp. nov. rinojensis, NRRL B-50319, *Chromobacterium subtsugae* NRRL B-30655, *Chromobacterium vaccinii* NRRL B-50880, *Flavobacterium* H492, NRRL B-50584, *Metarhizium anisopliae* F52 (also known as *Metarhizium anisopliae* strain 52, *Metarhizium anisopliae* strain 7, *Metarhizium anisopliae* strain 43 and *Metarhizium anisopliae* BIO-1020, TAE-001; deposited as DSM 3884, DSM 3885, ATCC 90448, SD 170 and ARSEF 7711) and/or *Paecilomyces fumosoroseus* FE991), and/or one or more fungicidal extracts (e.g., an extract of media comprising *Ampelomyces quisqualis* AQ 10® (Intrachem Bio GmbH & Co. KG, Germany), *Aspergillus flavus* AFLA-GUARD® (Syngenta Crop Protection, Inc., CH), *Aureobasidium pullulans* BOTECTOR® (bio-ferm GmbH, Germany), *Bacillus pumilus*AQ717 (NRRL B-21662), *Bacillus pumilus* NRRL B-30087, *Bacillus* AQ175 (ATCC 55608), *Bacillus* AQ177 (ATCC 55609), *Bacillus subtilis* AQ713 (NRRL B-21661), *Bacillus subtilis* AQ743 (NRRL B-21665), *Bacillus amyloliquefaciens* FZB24, *Bacillus amyloliquefaciens* NRRL B-50349, *Bacillus amyloliquefaciens* TJ1000 (also known as 1BE, isolate ATCC BAA-390), *Bacillus thuringiensis* AQ52 (NRRL B-21619), *Candida oleophila* I-82 (e.g., ASPIRE® from Ecogen Inc., USA), *Candida saitoana* BIO-CURE® (in mixture with lysozyme; BASF, USA) and BIOCOAT® (ArystaLife Science, Ltd., Cary, NC), *Clonostachys rosea* f. *catenulata* (also referred to as *Gliocladium catenulatum*) J1446 (PRESTOP®, Verdera, Finland), *Coniothyrium minitans* CONTANS® (Prophyta, Germany), *Cryphonectria parasitica* (CNICM, France), *Cryptococcus albidus* YIELD PLUS® (Anchor Bio-Technologies, South Africa), *Fusarium oxysporum* BIOFOX® (from S.I.A.P.A., Italy) and FUSACLEAN® (Natural Plant Protection, France), *Metschnikowia fructicola* SHEMER® (Agrogreen, Israel), *Microdochium dimerum* ANTIBOT® (Agrauxine, France), *Muscodor albus* NRRL 30547, *Muscodor roseus* NRRL 30548, *Phlebiopsis gigantea* ROTSOP® (Verdera, Finland), *Pseudozyma flocculosa* SPORODEX® (Plant Products Co. Ltd., Canada), *Pythium oligandrum* DV74 (POLYVERSUM®, Remeslo SSRO, Biopreparaty, Czech Rep.), *Reynoutria sachlinensis* (e.g., REGALIA® from Marrone BioInnovations, USA), *Streptomyces* NRRL B-30145, *Streptomyces* M1064, *Streptomyces galbus* NRRL 30232, *Streptomyces lydicus* WYEC 108 (ATCC 55445), *Streptomyces violaceusniger* YCED 9 (ATCC 55660; DE-THATCH-9®, DECOMP-9® and THATCH CONTROL®, Idaho Research Foundation, USA), *Streptomyces* WYE 53 (ATCC 55750; DE-THATCH-9®, DECOMP-9® and THATCH CONTROL®, Idaho Research Foundation, USA), *Talaromyces flavus* V117b (PROTUS®, Prophyta, Germany), *Trichoderma asperellum* SKT-1 (ECO-HOPE®, Kumiai Chemical Industry Co., Ltd., Japan), *Trichoderma atroviride* LC52 (SENTINEL®, Agrimm Technologies Ltd, NZ), *Trichoderma harzianum* T-22 (PLANTSHIELD®, der Firma BioWorks Inc., USA), *Trichoderma harzianum* TH-35 (ROOT PRO®, from Mycontrol Ltd., Israel), *Trichoderma harzianum* T-39 (TRICHODEX®, Mycontrol Ltd., Israel; TRICHODERMA 2000®, Makhteshim Ltd., Israel), *Trichoderma harzianum* ICC012 and *Trichoderma viride* TRICHOPEL (Agrimm Technologies Ltd, NZ), *Trichoderma harzianum* ICC012 and *Trichoderma viride* ICC080 (REMEDIER® WP, Isagro Ricerca, Italy), *Trichoderma polysporum* and *Trichoderma harzianum* (BINAB®, BINAB Bio-Innovation AB, Sweden), *Trichoderma stromaticum* TRICOVAB® (C.E.P.L.A.C., Brazil), *Trichoderma virens* GL-21 (SOILGARD®, Certis LLC, USA), *Trichoderma virens* G1-3, ATCC 57678, *Trichoderma virens* G1-21 (Thermo Trilogy Corporation, Wasco, CA), *Trichoderma virens* G1-3 and *Bacillus amyloliquefaciens* FZB2, *Trichoderma virens* G1-3 and *Bacillus amyloliquefaciens* NRRL B-50349, *Trichoderma virens* G1-3 and *Bacillus amyloliquefaciens* TJ1000, *Trichoderma virens* G1-21 and *Bacillus amyloliquefaciens* FZB24, *Trichoderma virens* G1-21 and *Bacillus amyloliquefaciens* NRRL B-50349, *Trichoderma virens* G1-21 and *Bacillus amyloliquefaciens* TJ1000, *Trichoderma viride* TRIECO® (Ecosense Labs. (India) Pvt. Ltd., Indien, BIO-CURE® F from T. Stanes & Co. Ltd., Indien), *Trichoderma viride* TV1 (Agribiotec srl, Italy), *Trichoderma viride* ICC080, and/or *Ulocladium oudemansii* HRU3 (BOTRY-ZEN®, Botry-Zen Ltd, NZ)), and combinations thereof.

In some embodiments, the seed treatment active comprises one or more beneficial microbes. Non-limiting examples of such microbes include beneficial microbes selected from the following genera: *Actinomycetes, Agrobacterium, Arthrobacter, Alcaligenes, Acinetobacter* spp, *Azospirillum* spp, *Aureobacterium, Azobacter, Azorhizobium, Bacillus, Beijerinckia, Bradyrhizobium, Brevibacillus, Burkholderia, Chromobacterium, Chryseomonas* spp., *Clostridium, Clavibacter, Comamonas, Corynebacterium, Curtobacterium, Enterobacter, Eupenicillium* spp., *Exiguobacterium* spp., *Flavobacterium, Gluconobacter, Hydrogenophaga, Hymenoscyphous, Klebsiella, Kluyvera* spp., *Methylobacterium, Paenibacillus, Pasteuria, Photorhabdus, Phyllobacterium, Pseudomonas, Rhizobium, Rhizobacter, Rhizopogon, Serratia, Sinorhizobium, Sphingobacterium, Swaminathania* spp., *Stenotrophomonas, Streptomyces* spp., *Thiobacillus, Variovorax, Vibrio, Xanthobacter, Xanthomonas* and *Xenorhabdus*, or any combination thereof. According to some embodiments, the seed treatment active comprises one or more of *Bacillus amyloliquefaciens, Bacillus cereus, Bacillus firmus, Bacillus, lichenformis, Bacillus pumilus, Bacillus sphaericus, Bacillus subtilis, Bacillus thuringiensis, Chromobacterium subtsugae, Pasteuria penetrans, Pasteuria usage,* and *Pseudomona fluorescens*. According to some embodiments, a microbe may comprise a fungus of the genus *Alternaria, Ampelomyces, Arthrobotrys* spp., *Aspergillus, Aureobasidium, Beauveria, Candida* spp., *Colletotrichum, Coniothyrium, Gigaspora* spp., *Gliocladium, Glomus* spp., *Laccaria* spp., *Metarhizium, Mucor* spp., *Muscodor, Oidiodendron* spp., *Paecilomyces, Penicillium* spp., *Pisolithus* spp., *Scleroderma, Trichoderma, Typhula, Ulocladium,* and *Verticillium*. In another aspect, a fungus is *Beauveria bassiana, Coniothyrium minitans, Gliocladium virens, Muscodor albus, Paecilomyces lilacinus,* or *Trichoderma polysporum*.

In some embodiments, the seed treatment active comprises one or more lipo-chitooligosaccharides (LCOs), chitin oligomer(s) and/or chitosan oligomer(s) (collectively referred to hereinafter as COs), and/or chitinous compounds.

LCOs, sometimes referred to as symbiotic nodulation (Nod) signals (or Nod factors) or as Myc factors, consist of an oligosaccharide backbone of β-1,4-linked N-acetyl-D-glucosamine ("GlcNAc") residues with an N-linked fatty acyl chain condensed at the non-reducing end. As understood in the art, LCOs differ in the number of GlcNAc residues in the backbone, in the length and degree of saturation of the fatty acyl chain and in the substitutions of reducing and non-reducing sugar residues. See, e.g., Denarie et al., Ann. Rev. Biochem. 65:503 (1996); Diaz et al., Mol. Plant-Microbe Interactions 13:268 (2000); Hungria et al., Soil Biol. Biochem. 29:819 (1997); Hamel et al., Planta 232:787 (2010); and Prome et al., Pure & Appl. Chem. 70(1):55 (1998), the contents and disclosures of which are incorporated herein by reference.

LCOs may be synthetic or obtained from any suitable source. See, e.g., WO 2005/063784, WO 2007/117500 and WO 2008/071674, the contents and disclosures of which are incorporated herein by reference. In some aspects, a synthetic LCO may have the basic structure of a naturally occurring LCO but contains one or more modifications or substitutions, such as those described in Spaink, Crit. Rev.

*Plant Sci.* 54:257 (2000). LCOs and precursors for the construction of LCOs (e.g., COs, which may themselves be useful as a biologically active ingredient) can be synthesized by genetically engineered organisms. See, e.g., Samain et al., *Carbohydrate Res.* 302:35 (1997); Cottaz et al.,Meth. Eng. 7(4):311 (2005); and Samain et al., *J. Biotechnol.* 72:33 (1999) (e.g., FIG. 1 therein, which shows structures of COs that can be made recombinantly in *E. coli* harboring different combinations of genes *nodBCHL*), the contents and disclosures of which are incorporated herein by reference.

LCOs (and derivatives thereof) may be included or utilized in compositions in various forms of purity and can be used alone or in the form of a culture of LCO-producing bacteria or fungi. For example, OPTIMIZE® (commercially available from Monsanto Company (St. Louis, MO)) contains a culture of *Bradyrhizobium japonicum* that produces LCO. Methods to provide substantially pure LCOs include removing the microbial cells from a mixture of LCOs and the microbe, or continuing to isolate and purify the LCO molecules through LCO solvent phase separation followed by HPLC chromatography as described, for example, in U.S. Pat. No. 5,549,718. Purification can be enhanced by repeated HPLC and the purified LCO molecules can be freeze-dried for long-term storage. According to some embodiments, the LCO(s) included in compositions of the present disclosure is/are at least 0.1%, 0.5%, 1%, 2%, 3%, 4%, 5%, 10%, 15%, 20%, 25%, 30%, 35%, 40%, 45%, 50%, 55%, 60%, 65%, 70%, 75%, 80%, 85%, 90%, 91%, 92%, 93%, 94%, 95%, 96%, 97%, 98%, 99% or 100% pure. Compositions and methods in some embodiments may comprise analogues, derivatives, hydrates, isomers, salts and/or solvates of LCOs. LCOs may be incorporated into compositions of the present disclosure in any suitable amount(s)/concentration(s). For example, compositions of the present disclosure comprise about $1\times10^{-20}$ M to about $1\times10^{-1}$ M LCO(s). For example, compositions of the present disclosure can comprise about $1\times10^{-20}$ M, $1\times10^{-19}$ M, $1\times10^{-18}$ M, $1\times10^{-17}$ M, $1\times10^{-16}$ M, $1\times10^{-15}$ M, $1\times10^{-14}$ M, $1\times10^{-13}$ M, $1\times10^{-12}$ M, $1\times10^{-11}$ M, $1\times10^{-10}$ M, $1\times10^{-9}$ M, $1\times10^{-8}$ M, $1\times10^{-7}$ M, $1\times10^{-6}$ M, $1\times10^{-5}$ M, $1\times10^{-4}$ M, $1\times10^{-3}$ M, $1\times10^{-2}$ M, $1\times10^{-1}$ M of one or more LCOs. In an aspect, the LCO concentration is $1\times10^{-14}$ M to $1\times10^{-5}$ M, $1\times10^{-12}$ M to $1\times10^{-6}$ M, or $1\times10^{-10}$ M to $1\times10^{-7}$ M. In an aspect, the LCO concentration is $1\times10^{-14}$ M to $1\times10^{-5}$ M, $1\times10^{-12}$ M to $1\times10^{-6}$ M, or $1\times10^{-10}$ M to $1\times10^{-7}$ M. The amount/concentration of LCO may be an amount effective to impart a positive trait or benefit to a plant, such as to enhance the disease resistance, growth and/or yield of the plant to which the composition is applied. According to some embodiments, the LCO amount/concentration is not effective to enhance the yield of the plant without beneficial contributions from one or more other constituents of the composition, such as CO and/or one or more pesticides.

In some embodiments, the seed treatment active comprises one or more chitin oligomers and/or chitosan oligomers. See, e.g., D'Haeze et al., *Glycobiol.* 12(6):79R (2002); Demont-Caulet et al., *Plant Physiol.* 120(1):83 (1999); Hanel et al., *Planta* 232:787 (2010); Muller et al., *Plant Physiol.* 124:733 (2000); Robina et al., *Tetrahedron* 58:521-530 (2002); Rouge et al., Docking of Chitin Oligomers and Nod Factors on Lectin Domains of the LysM-RLK Receptors in the Medicago-Rhizobium Symbiosis, in The Molecular Immunology of Complex Carbohydrates-3 (Springer Science, 2011); Van der Holst et al., *Curr. Opin. Struc. Biol.* 11:608 (2001); and Wan et al., *Plant Cell* 21:1053 (2009), the contents and disclosures of which are incorporated by reference. COs may be obtained from any suitable source. For example, COs may be derived from an LCO. For example, in an aspect, compositions comprise one or more COs derived from an LCO obtained (i.e., isolated and/or purified) from a strain of *Azorhizobium, Bradyrhizobium* (e.g., *B. japonicum*), *Mesorhizobium, Rhizobium* (e.g., *R. leguminosarum*), *Sinorhizobium* (e.g., *S. meliloti*), or mycorhizzal fungi (e.g., *Glomus intraradicus*). Alternatively, the CO may be synthetic. Methods for the preparation of recombinant COs are known in the art. See, e.g., Cottaz et al., *Meth. Eng.* 7(4):311 (2005); Samain et al., *Carbohydrate Res.* 302:35 (1997); and Samain et al., *J. Biotechnol.* 72:33 (1999), the contents and disclosures of which are incorporated herein by reference.

COs (and derivatives thereof) may be included or utilized in compositions in various forms of purity and can be used alone or in the form of a culture of CO-producing bacteria or fungi. According to some embodiments, the CO(s) included in compositions may be at least 0.1%, 0.5%, 1%, 2%, 3%, 4%, 5%, 6%, 7%, 8%, 9%, 10%, 15%, 20%, 30%, 40%, 50%, 60%, 70%, 75%, 80%, 85%, 90%, 91%, 92%, 93%, 94%, 95%, 96%, 97%, 98%, 99%, 99.5% or more pure. It is to be understood that compositions and methods of the present disclosure can comprise hydrates, isomers, salts and/or solvates of COs. COs in some embodiments may be incorporated into compositions in any suitable amount(s)/concentration(s). For example, compositions in some embodiments may comprise about $1\times10^{-20}$ M to about $1\times10^{-1}$ M COs, such as about $1\times10^{-20}$ M, $1\times10^{-19}$ M, $1\times10^{-18}$ M, $1\times10^{-17}$ M, $1\times10^{-16}$ M, $1\times10^{-15}$ M, $1\times10^{-14}$ M, $1\times10^{-13}$ M, $1\times10^{-12}$ M, $1\times10^{-11}$ M, $1\times10^{-10}$ M, $1\times10^{-9}$ M, $1\times10^{-8}$ M, $1\times10^{-7}$ M, $1\times10^{-6}$ M, $1\times10^{-5}$ M, $1\times10^{-4}$ M, $1\times10^{-3}$ M, $1\times10^{-2}$ M, or $1\times10^{-1}$ M of one or more COs. For example, the CO concentration may be $1\times10^{-14}$ M to $1\times10^{-5}$ M, $1\times10^{-12}$ M to $1\times10^{-6}$ M, or $1\times10^{-10}$ M to $1\times10^{-7}$ M. The amount/concentration of CO may be an amount effective to impart or confer a positive trait or benefit to a plant, such as to enhance the soil microbial environment, nutrient uptake, or increase the growth and/or yield of the plant to which the composition is applied. Compositions in some embodiments may comprise one or more suitable chitinous compounds, such as, for example, chitin (IUPAC: N-[5-[[3-acetylamino-4,5-dihydroxy-6-(hydroxymethyl)oxan-2yl]methoxymethyl]-2-[[5-acetylamino-4,6-dihydroxy-2-(hydroxymethyl)oxan-3-yl]methoxymethyl]-4-hydroxy-6-(hydroxymethyl)oxan-3-ys]ethanamide), chitosan (IUPAC: 5-amino-6-[5-amino-[5-amino-4,6-dihydroxy-2(hydroxymethyl)oxan-3-yl]oxy-4-hydroxy-2-(hydroxymethyl) oxan-3-yl]oxy-2 (hydroxymethyl)oxane-3,4-diol), and isomers, salts and solvates thereof.

Chitins and chitosans, which are major components of the cell walls of fungi and the exoskeletons of insects and crustaceans, are composed of GlcNAc residues. Chitins and chitosans may be obtained commercially or prepared from insects, crustacean shells, or fungal cell walls. Methods for the preparation of chitin and chitosan are known in the art. See, e.g., U.S. Pat. Nos. 4,536,207 (preparation from crustacean shells) and 5,965,545 (preparation from crab shells and hydrolysis of commercial chitosan); and Pochanavanich et al., *Lett. Appl. Microbiol.* 35:17 (2002) (preparation from fungal cell walls).

Deacetylated chitins and chitosans may be obtained that range from less than 35% to greater than 90% deacetylation and cover a broad spectrum of molecular weights, e.g., low molecular weight chitosan oligomers of less than 15 kD and chitin oligomers of 0.5 to 2 kD; "practical grade" chitosan with a molecular weight of about 15 kD; and high molecular weight chitosan of up to 70 kD. Chitin and chitosan compositions formulated for seed treatment are commercially available. Commercial products include, for example, ELEXA® (Plant Defense Boosters, Inc.) and BEYOND™ (Agrihouse, Inc.).

In some embodiments, the seed treatment active comprises one or more suitable flavonoids, including, but not limited to, anthocyanidins, anthoxanthins, chalcones, coumarins, flavanones, flavanonols, flavans and isoflavonoids, as well as analogues, derivatives, hydrates, isomers, polymers, salts and solvates thereof. Flavonoids are phenolic compounds having the general structure of two aromatic rings connected by a three-carbon bridge. Classes of flavonoids are known in the art. See, e.g., Jain et al., *J. Plant Biochem. & Biotechnol.* 11:1 (2002); and Shaw et al., *Environ. Microbiol.* 11:1867 (2006), the contents and disclosures of which are incorporated herein by reference. Several flavonoid compounds are commercially available. Flavonoid compounds may be isolated from plants or seeds, e.g., as described in U.S. Pat. Nos. 5,702,752; 5,990,291; and 6,146,668. Flavonoid compounds may also be produced by genetically engineered organisms, such as yeast, See, e.g. Ralston et al., *Plant Physiol.* 137:1375 (2005).

In some embodiments, the seed treatment active comprises one or more flavanones, such as one or more of butin, eriodictyol, hesperetin, hesperidin, homoeriodictyol, isosakuranetin, naringenin, naringin, pinocembrin, poncirin, sakuranetin, sakuranin, and/or sterubin, one or more flavanonols, such as dihydrokaempferol and/or taxifolin, one or more flavans, such as one or more flavan-3-ols (e.g., catechin (C), catechin 3-gallate (Cg), epicatechins (EC), epigallocatechin (EGC) epicatechin 3-gallate (ECg), epigallcatechin 3-gallate (EGCg), epiafzelechin, fisetinidol, gallocatechin (GC), gallocatechin 3-gallate (GCg), guibourtinidol, mesquitol, robinetinidol, theaflavin-3-gallate, theaflavin-3'-gallate, theflavin-3,3'-digallate, thearubigin), flavan-4-ols (e.g., apiforol and/or luteoforol) and/or flavan-3, 4-diols (e.g., leucocyanidin, leucodelphinidin, leucofisetinidin, leucomalvidin, luecopelargonidin, leucopeonidin, leucorobinetinidin, melacacidin and/or teracacidin) and/or dimers, trimers, oligomers and/or polymers thereof (e.g., one or more proanthocyanidins), one or more isoflavonoids, such as one or more isoflavones or flavonoid derivatives (e.g, biochanin A, daidzein, formononetin, genistein and/or glycitein), isoflavanes (e.g., equol, ionchocarpane and/or laxifloorane), isoflavandiols, isoflavenes (e.g., glabrene, haginin D and/or 2-methoxyjudaicin), coumestans (e.g., coumestrol, plicadin and/or wedelolactone), pterocarpans, roetonoids, neoflavonoids (e.g, calophyllolide, coutareagenin, dalbergichromene, dalbergin, nivetin), and/or pterocarpans (e.g., bitucarpin A, bitucarpin B, erybraedin A, erybraedin B, erythrabyssin II, erthyrabissin-1, erycristagallin, glycinol, glyceollidins, glyceollins, glycyrrhizol, maackiain, medicarpin, morisianine, orientanol, phaseolin, pisatin, striatine, trifolirhizin), and combinations thereof. Flavonoids and their derivatives may be included in compositions in any suitable form, including, but not limited to, polymorphic and crystalline forms. Flavonoids may be included in compositions in any suitable amount(s) or concentration(s). The amount/concentration of a flavonoid(s) may be an amount effective, which may be indirectly through activity on soil microorganisms or other means, such as to enhance plant nutrition and/or yield. According to some embodiments, a flavonoid amount/concentration may not be effective to enhance the nutrition or yield of the plant without the beneficial contributions from one or more other ingredients of the composition, such as LCO, CO, and/or one or more pesticides.

In some embodiments, the seed treatment active comprises one or more non-flavonoidnod-gene inducer(s), including, but not limited to, jasmonic acid ([1R-[1α,2β (Z)]]-3-oxo-2-(pentenyl)cyclopentaneacetic acid; JA), linoleic acid ((Z,Z)-9,12-Octadecadienoic acid) and/or linolenic acid ((Z,Z,Z)-9,12,15-octadecatrienoic acid), and analogues, derivatives, hydrates, isomers, polymers, salts and solvates thereof. Jasmonic acid and its methyl ester, methyl jasmonate (MeJA), collectively known as jasmonates, are octadecanoid-based compounds that occur naturally in some plants (e.g., wheat), fungi (e.g., *Botryodiplodia theobromae, Gibbrella fujikuroi*), yeast (e.g., *Saccharomyces cerevisiae*) and bacteria (e.g., *Escherichia coli*). Linoleic acid and linolenic acid may be produced in the course of the biosynthesis of jasmonic acid.

Derivatives of jasmonic acid, linoleic acid, and linolenic acid that may be included or used in compositions in some embodiments include esters, amides, glycosides and salts thereof. Representative esters are compounds in which the carboxyl group of linoleic acid, linolenic acid, or jasmonic acid has been replaced with a —COR group, where R is an —OR$^1$ group, in which R$^1$ is: an alkyl group, such as a $C_1$-$C_8$ unbranched or branched alkyl group, e.g., a methyl, ethyl or propyl group; an alkenyl group, such as a $C_2$-$C_8$ unbranched or branched alkenyl group; an alkynyl group, such as a $C_2$-$C_8$ unbranched or branched alkynyl group; an aryl group having, for example, 6 to 10 carbon atoms; or a heteroaryl group having, for example, 4 to 9 carbon atoms, wherein the heteroatoms in the heteroaryl group can be, for example, N, O, P, or S. Representative amides are compounds in which the carboxyl group of linoleic acid, linolenic acid, or jasmonic acid has been replaced with a —COR group, where R is an NR$^2$R$^3$ group, in which R$^2$ and R$^3$ are each independently: a hydrogen; an alkyl group, such as a $C_1$-$C_8$ unbranched or branched alkyl group, e.g., a methyl, ethyl or propyl group; an alkenyl group, such as a $C_2$-$C_8$ unbranched or branched alkenyl group; an alkynyl group, such as a $C_2$-$C_8$ unbranched or branched alkynyl group; an aryl group having, for example, 6 to 10 carbon atoms; or a heteroaryl group having, for example, 4 to 9 carbon atoms, wherein the heteroatoms in the heteroaryl group can be, for example, N, O, P, or S. Esters may be prepared by known methods, such as acid-catalyzed nucleophilic addition, wherein the carboxylic acid is reacted with an alcohol in the presence of a catalytic amount of a mineral acid. Amides may also be prepared by known methods, such as by reacting the carboxylic acid with the appropriate amine in the presence of a coupling agent, such as dicyclohexyl carbodiimide (DCC), under neutral conditions. Suitable salts of linoleic acid, linolenic acid and jasmonic acid include, for example, base addition salts. The bases that may be used as reagents to prepare metabolically acceptable base salts of these compounds include those derived from cations such as alkali metal cations (e.g., potassium and sodium) and alkaline earth metal cations (e.g., calcium and magnesium). These salts may be readily prepared by mixing a solution of linoleic acid, linolenic acid, or jasmonic acid with a solution of the base. The salts may be precipitated from solution and collected by filtration, or may be recovered by other means such as by evaporation of the solvent.

In some embodiments, the seed treatment active comprises one or more plant growth regulators including, but not limited to, ethephon and/or thidiazuron.

In some embodiments, the seed treatment active comprises one or more karrakins, including but not limited to 2H-furo[2,3-c]pyran-2-ones, as well as analogues, derivatives, hydrates, isomers, polymers, salts and solvates thereof. Examples of biologically acceptable salts of karrakins include acid addition salts formed with biologically acceptable acids, examples of which include hydrochloride, hydrobromide, sulphate or bisulphate, phosphate or hydrogen phosphate, acetate, benzoate, succinate, fumarate, maleate, lactate, citrate, tartrate, gluconate; methanesulphonate, benzenesulphonate and p-toluenesulphonic acid. Additional biologically acceptable metal salts may include alkali metal salts, with bases, examples of which include the sodium and potassium salts. Karrakins may be incorporated into compositions in any suitable amount(s) or concentration(s). For example, the amount/concentration of a karrakin may be an amount or concentration effective to impart or confer a positive trait or benefit to a plant, such as to enhance the disease resistance, growth and/or yield of the plant to which the composition is applied. In an aspect, a karrakin amount/concentration may not be effective to enhance the disease resistance, growth and/or yield of the plant without beneficial contributions from one or more other ingredients of the composition, such as a LCO, CO and/or one or more pesticides.

In some embodiments, the seed treatment active comprises one or more anthocyanidins and/or anthoxanthins, such as one or more of cyanidin, delphinidin, malvidin, pelargonidin, peonidin, petunidin, flavones (e.g., apigenin, baicalein, chrysin, 7,8-dihydroxyflavone, diosmin, flavoxate, 6-hydroxyflavone, luteolin, scutellarein, tangeritin and/or wogonin) and/or flavonols (e.g., amurensin, astragalin, azaleatin, azalein, fisetin, furanoflavonols galangin, gossypetin, 3-hydroxyflavone, hyperoside, icariin, isoquercetin, kaempferide, kaempferitrin, kaempferol, isorhamnetin, morin, myricetin, myricitrin, natsudaidain, pachypodol, pyranoflavonols quercetin, quericitin, rhamnazin, rhamnetin, robinin, rutin, spiraeoside, troxerutin and/or zanthorhamnin), and combinations thereof.

In some embodiments, the seed treatment active comprises one or more gluconolactone and/or an analogue, derivative, hydrate, isomer, polymer, salt and/or solvate thereof. Gluconolactone may be incorporated into compositions in any suitable amount(s)/concentration(s). For example, the amount/concentration of a gluconolactone amount/concentration may be an amount effective to impart or confer a positive trait or benefit to a plant, such as to enhance the disease resistance, growth and/or yield of the plant to which the composition is applied. In an aspect, the gluconolactone amount/concentration may not be effective to enhance the disease resistance, growth and/or yield of the plant without beneficial contributions from one or more other ingredients of the composition, such as a LCO, CO and/or one or more pesticides.

In some embodiments, the seed treatment active comprises one or more nutrient(s) and/or fertilizer(s), such as organic acids (e.g., acetic acid, citric acid, lactic acid, malic acid, taurine, etc.), macrominerals (e.g., phosphorous, calcium, magnesium, potassium, sodium, iron, etc.), trace minerals (e.g., boron, cobalt, chloride, chromium, copper, fluoride, iodine, iron, manganese, molybdenum, selenium, zinc, etc.), vitamins, (e.g., vitamin A, vitamin B complex (i.e., vitamin $B_1$, vitamin $B_2$, vitamin $B_3$, vitamin $B_5$, vitamin $B_6$, vitamin $B_7$, vitamin $B_8$, vitamin $B_9$, vitamin $B_{12}$, choline) vitamin C, vitamin D, vitamin E, vitamin K.), and/or carotenoids (α-carotene, β-carotene, cryptoxanthin, lutein, lycopene, zeaxanthin, etc.), and combinations thereof. In an aspect, compositions of the present disclosure may comprise macro- and micronutrients of plants or microbes, including phosphorous, boron, chlorine, copper, iron, manganese, molybdenum and/or zinc. According to some embodiments, compositions may comprise one or more beneficial micronutrients. Non-limiting examples of micronutrients for use in compositions described herein may include vitamins, (e.g., vitamin A, vitamin B complex (i.e., vitamin B1, vitamin B2, vitamin B3, vitamin B5, vitamin B6, vitamin B7, vitamin B8, vitamin B9, vitamin B12, choline) vitamin C, vitamin D, vitamin E, vitamin K, carotenoids (α-carotene, β-carotene, cryptoxanthin, lutein, lycopene, zeaxanthin, etc.), macrominerals (e.g., phosphorous, calcium, magnesium, potassium, sodium, iron, etc.), trace minerals (e.g., boron, cobalt, chloride, chromium, copper, fluoride, iodine, iron, manganese, molybdenum, selenium, zinc, etc.), organic acids (e.g., acetic acid, citric acid, lactic acid, malic aclid, taurine, etc.), and combinations thereof. In a particular aspect, compositions may comprise phosphorous, boron, chlorine, copper, iron, manganese, molybdenum, and/or zinc, and combinations thereof. For compositions comprising phosphorous, it is envisioned that any suitable source of phosphorous may be used. For example, phosphorus may be derived from a rock phosphate source, such as monoammonium phosphate, diammonium phosphate, monocalcium phosphate, super phosphate, triple super phosphate, and/or ammonium polyphosphate, an organic phosphorous source, or a phosphorous source capable of solubilization by one or more microorganisms (e.g., *Penicillium bilaiae*).

In view of the above, it will be seen that several advantageous results are obtained.

Having described the invention in detail, it will be apparent that modifications and variations are possible without departing from the scope of the invention defined in the appended claims.

When introducing elements of the embodiment(s), the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions, products, and methods without departing from the scope of the invention, it is intended that all matter contained in the above description and shown in the accompanying drawings shall be interpreted as illustrative and not in a limiting sense.

What is claimed is:

1. A seed treater having upper and lower ends, the seed treater comprising:
   an air mover configured to generate forced air;
   a mixing bowl defining an open interior having a vertical axis, and being configured to mix a seed treatment with seeds received in the open interior of the mixing bowl, the mixing bowl including
      a stator having an annular upper inner surface extending around the vertical axis of the mixing bowl and defining an upper portion of the open interior of the mixing bowl, and
      a rotor having a concave inner surface below the annular upper inner surface of the stator and defining a lower portion of the open interior of the mixing bowl, wherein the rotor is rotatable relative to the stator about the vertical axis of the mixing bowl so that seeds within the lower portion of the open interior of the mixing bowl flow upward along the concave inner surface to the annular inner surface of the stator;
   an air duct fluidly connecting the air mover to the mixing bowl, the air duct including a plurality of duct outlets extending through the annular upper inner surface of the stator and wherein the duct outlets are spaced apart from one another around the annular upper inner surface of the stator;

wherein the duct outlets define openings and are configured to direct the forced air from the air mover into the upper portion of the open interior defined by the annular upper inner surface of the stator to direct the seeds flowing in the upper portion of the interior of the mixing bowl inward toward the vertical axis of the mixing bowl as the rotor rotates relative to the stator, and wherein the openings defined by the duct outlets extend through the annular upper inner surface of the stator, and a plurality of duct fittings, wherein the duct fittings are mounted on the stator such that a portion of the duct fittings is received in the opening defined by the duct outlet, wherein the duct fittings comprise an engagement surface configured to engage an outer surface of the stator.

2. The seed treater set forth in claim 1, wherein the annular upper inner surface of the stator is free from one or more baffles.

3. The seed treater set forth in claim 1, wherein the air duct comprises a plurality of air ducts fluidly connected to one another to at least partially define an air manifold fluidly connected to the air mover.

4. The seed treater set forth in claim 1, wherein the rotor, the air mover, and the duct outlet are configured to produce a recirculating flow of seeds upward along the concave inner surface to the annular inner surface, and downward from the annular inner surface toward a bottom of the concave inner surface at an inward location spaced from the concave inner surface and the annular inner surface.

5. The seed treater set forth in claim 1, the duct outlet is configured to direct forced air in a direction that is inward toward the vertical axis of the mixing and transverse to the vertical axis of the mixing bowl.

6. The seed treater set forth in claim 1, the duct outlet is configured to direct forced air in a direction that is downward.

7. The seed treater set forth in claim 1, the duct outlet is configured to direct forced air in a direction that is upward.

8. The seed treater set forth in claim 1, further comprising a lid covering the upper portion of the open interior.

9. The seed treater set forth in claim 1, further comprising a valve fluidly connected to the air duct upstream of the duct outlet and configured to regulate the flow of forced air to the duct outlet.

10. The seed treater set forth in claim 9, further comprising an air pressure sensor connected to the air duct upstream of the duct outlet and in fluid communication with the flow of forced air to the duct outlet, the air pressure sensor configured to sense the pressure of the forced air in the air duct.

11. The seed treater set forth in claim 9, further comprising a controller in communication with the valve, wherein the valve is actuatable by the controller.

12. The seed treater set forth in claim 11, wherein the controller is configured to adjust the flow of forced air entering the upper portion of the open interior.

13. The seed treater set forth in claim 1, further comprising a seed treatment applicator configured to dispense seed treatment into the open interior of the mixing bowl as the rotor rotates relative to the stator.

14. The seed treater set forth in claim 13, wherein the seed treatment applicator is configured to dispense seed treatment onto the seeds as the seeds flow within the mixing bowl.

15. The seed treater set forth in claim 14, further comprising a lid covering the upper portion of the open interior, wherein the seed treatment applicator extends through the lid into the open interior.

16. The seed treater set forth in claim 1, further comprising a driver operatively connected to the rotor to drive rotation of the rotor relative to the stator about the vertical axis of the mixing bowl.

17. A method of treating seeds using the seed treater set forth in claim 1, the method comprising:
loading seeds into the open interior of the mixing bowl;
rotating the rotor relative to the stator about the vertical axis of the mixing bowl so that the seeds within the open interior of the mixing bowl flow upward along the concave inner surface of the rotor to the annular upper inner surface of the stator;
delivering the forced air from the air mover, simultaneously with said rotating the rotor, through the opening defined by the duct outlet of the air duct into the upper portion of the open interior defined by the annular upper inner surface of the stator to direct the seeds flowing in the upper portion of the interior of the mixing bowl inward toward the vertical axis of the mixing bowl; and
delivering the seed treatment into the mixing bowl.

18. The seed treater set forth in claim 1, wherein each duct fitting comprises a fitting chamber.

19. The seed treater set forth in claim 18, wherein each duct fitting further comprises at least two fitting inlets fluidly connected to the fitting chamber and the fitting chamber is configured to facilitate the mixing of air streams from the fitting inlets.

20. The seed treater set forth in claim 18, wherein the fitting chamber comprises a wave-like or sinusoidal-like cross-sectional shape.

* * * * *